(12) United States Patent
Varanese et al.

(10) Patent No.: US 8,982,987 B2
(45) Date of Patent: Mar. 17, 2015

(54) PAIRED OFDM PILOT SYMBOLS

(71) Applicant: QUALCOMM Incorporated, San Diego, CA (US)

(72) Inventors: Nicola Varanese, Nuremberg (DE); Christian Pietsch, Nuremberg (DE); Juan Montojo, Nuremberg (DE); Christoph Arnold Joetten, Wadern (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/853,414

(22) Filed: Mar. 29, 2013

(65) Prior Publication Data

US 2013/0259153 A1    Oct. 3, 2013

Related U.S. Application Data

(60) Provisional application No. 61/618,624, filed on Mar. 30, 2012, provisional application No. 61/719,326, filed on Oct. 26, 2012.

(51) Int. Cl.
*H04L 27/00* (2006.01)
*H04L 25/02* (2006.01)
(Continued)

(52) U.S. Cl.
CPC ............ *H04L 25/022* (2013.01); *H04L 1/0001* (2013.01); *H04L 25/0232* (2013.01); *H04L 27/2613* (2013.01); *H04L 27/2647* (2013.01); *H04L 27/3854* (2013.01);
(Continued)

(58) Field of Classification Search
CPC ..................................................... H04L 5/0007
USPC ......................................................... 375/295
See application file for complete search history.

(56) References Cited

U.S. PATENT DOCUMENTS 6,535,715 B2    3/2003    Dapper et al.
6,553,040 B2    4/2003    Bernath et al.
(Continued)

FOREIGN PATENT DOCUMENTS

EP    1793548 A1    6/2007
EP    2259517 A2    12/2010
(Continued)

OTHER PUBLICATIONS

International Search Report and Written Opinion—PCT/US2013/034825—ISA/EPO—Jul. 2, 2013.
(Continued)

*Primary Examiner* — Santiago Garcia
(74) *Attorney, Agent, or Firm* — Mahamedi Paradice LLP

(57) ABSTRACT

Successive pairs of OFDM symbols are transmitted by an OFDM transmitter and received by an OFDM receiver. The successive pairs include a first pair of OFDM symbols. First and second OFDM symbols of the first pair both include pilot symbols on two subcarriers that are symmetric about a center carrier frequency. The two subcarriers are the same for the first and second OFDM symbols. The pilot symbols on the two subcarriers for the first and second OFDM symbols compose an orthogonal matrix. The OFDM receiver estimates frequency responses at frequencies including the frequencies of the two subcarriers and compensates for signal impairment based at least in part on the estimated frequency responses.

26 Claims, 10 Drawing Sheets

(51) Int. Cl.
*H04L 1/00* (2006.01)
*H04L 27/26* (2006.01)
*H04L 27/38* (2006.01)

(52) U.S. Cl.
CPC ....... *H04L 27/3863* (2013.01); *H04L 27/3872* (2013.01); *H04L 2027/003* (2013.01); *H04L 2027/0073* (2013.01); *H04L 2027/0089* (2013.01); *H04L 2027/0093* (2013.01); *H04L 2027/0095* (2013.01)
USPC ....................................................... 375/295

(56) References Cited

U.S. PATENT DOCUMENTS

| | | | |
|---|---|---|---|
| 6,697,374 | B1 | 2/2004 | Shraga et al. |
| 7,224,666 | B2 | 5/2007 | Gummadi et al. |
| 7,313,203 | B2 | 12/2007 | Tubbax et al. |
| 7,443,783 | B2 | 10/2008 | DeChamps et al. |
| 7,466,768 | B2 | 12/2008 | Su et al. |
| 7,626,921 | B2 | 12/2009 | Egashira et al. |
| 7,844,004 | B2 | 11/2010 | De Rore |
| 7,885,360 | B2 | 2/2011 | Tanabe et al. |
| 7,899,140 | B2 | 3/2011 | Yousef |
| 7,957,476 | B2 | 6/2011 | Sanada et al. |
| 7,961,696 | B2 | 6/2011 | Ma et al. |
| 8,081,690 | B2 | 12/2011 | Ma et al. |
| 8,194,529 | B2 | 6/2012 | Stadelmeier et al. |
| 8,265,181 | B2 | 9/2012 | Luong et al. |
| 8,279,958 | B2 | 10/2012 | Okehie et al. |
| 8,290,083 | B2 | 10/2012 | Chrabieh |
| 2003/0072254 | A1 | 4/2003 | Ma et al. |
| 2005/0107059 | A1 | 5/2005 | Lehning et al. |
| 2007/0025460 | A1* | 2/2007 | Budianu et al. ............... 375/260 |
| 2007/0183482 | A1* | 8/2007 | Fujita et al. .................. 375/141 |
| 2007/0201351 | A1* | 8/2007 | Egashira et al. ............. 370/208 |
| 2008/0063098 | A1* | 3/2008 | Lai et al. ....................... 375/260 |
| 2008/0165891 | A1 | 7/2008 | Budianu et al. |
| 2008/0267320 | A1 | 10/2008 | Dateki |
| 2008/0298227 | A1 | 12/2008 | Jonsson |
| 2008/0310534 | A1 | 12/2008 | Egashira et al. |
| 2009/0116581 | A1* | 5/2009 | Liau ............................ 375/296 |
| 2009/0247172 | A1 | 10/2009 | Palanki et al. |
| 2009/0257520 | A1 | 10/2009 | Lin et al. |
| 2010/0136919 | A1 | 6/2010 | Sathananthan et al. |
| 2010/0195518 | A1 | 8/2010 | McCloud et al. |
| 2010/0197241 | A1 | 8/2010 | Aedudodla et al. |
| 2010/0208783 | A1 | 8/2010 | Lin et al. |
| 2011/0135036 | A1 | 6/2011 | Andgart et al. |
| 2011/0194656 | A1 | 8/2011 | Shaked et al. |
| 2011/0317785 | A1 | 12/2011 | Petrov et al. |
| 2012/0033751 | A1 | 2/2012 | Sathananthan et al. |
| 2012/0134440 | A1 | 5/2012 | Yun et al. |
| 2012/0147761 | A1 | 6/2012 | Zhang et al. |
| 2012/0207257 | A1 | 8/2012 | Park et al. |
| 2012/0275784 | A1 | 11/2012 | Soto et al. |
| 2013/0121392 | A1 | 5/2013 | Thompson et al. |
| 2013/0188757 | A1 | 7/2013 | Kalyani et al. |
| 2013/0259173 | A1 | 10/2013 | VARANESE; Nicola et al. |
| 2014/0010268 | A1 | 1/2014 | Yu et al. |
| 2014/0177741 | A1 | 6/2014 | Liu et al. |

FOREIGN PATENT DOCUMENTS

| | | |
|---|---|---|
| GB | 2489035 A | 9/2012 |
| JP | 2004159084 A | 6/2004 |
| WO | WO-02097476 A2 | 12/2002 |
| WO | 2008112587 | 9/2008 |

OTHER PUBLICATIONS

Mamiko Inamori et al: "IQ Imbalance Estimation Scheme in the Presence of DC Offset and Frequency Offset in the Frequency Domain", IEICE Transactions on Fundamentals of Electronics, Communications and Computer Sciences, Engineering Sciences Society, Tokyo, JP, vol. E92A, No. 11, Nov. 1, 2009, pp. 2688-2696, XP001550868,ISSN: 0916-8508, DOI: 10.1587/TRANSFUN.E92.A.2688.

Garavaglia, et al., "OFDMA PHY for EPoC: a Baseline Proposal," IEEE 802.3bn, Geneva, Switzerland, Sep. 27-28, 2012, 30 pages.

Luise Marco et al., "Carrier Frequency Recovery in All-Digital Modems for Burst-Mode Transmissions", IEEE Transactions on Communications, Vol. 43, No. 2/3/4, Feb./Mar./Apri. 1999, p. 1169-1178.

Van De Beek, "ML Estimation of Time and Frequency Offset in OFDM Systems," IEEE Transactions on Signal Processing, 1997, 45 (7), p. 1800-1805.

Boyd, Ed, "EPOC Upstream Mapping", IEEE 802.3bn EPoC proceedings, San Antonio, TX, Nov. 2012, 27 pages.

Boyd, Ed, "EPOC Upstream Mapping, Part 2", IEEE 802.3bn EPoC proceedings, Feb. 2013, 16 pages.

Co-pending U.S. Appl. No. 13/968,270, filed Aug. 15, 2013.
Co-pending U.S. Appl. No. 13/970,992, filed Aug. 20, 2013.
Co-pending U.S. Appl. No. 14/084,310, filed Nov. 19, 2013.

Kliger A., et al., "Baseline Proposal for EPoC PHY Layer; kliger_01_0912", IEEE DRAFT; Kliger_01_0912, IEEE-SA, Piscataway, NJ USA, vol. 802.3bn, Sep. 22, 2012, pp. 1-26, XP068020499, [retrieved on Sep. 22, 2012], pp. 5-9, pp. 23, 24.

Kliger A., et al., "Baseline Proposal foe EPoC PHY Layer; kliger_01a_0912", IEEE DRAFT;Kliger_01A_0912, IEEE-SA, Piscataway, NJ USA, vol. 802.3bn, Sep. 22, 2012, pp. 1-23, XP068020524, [retrieved on Sep. 22, 2012], pp. 3, 4, 10.

Kliger A., et al."OFDM Numerology for EPOC; kliger_01_0113", IEEE DRAFT;Kliger_01_0113, IEEE-SA, Piscataway, NJ, USA, vol. 8902.3bn, Jan. 29, 2013, pp. 1-20, XP068047297, [retrieved on Jan. 29, 2013], pp. 16-19.

Montreuil L., "EpoC Modulation Orders EPoC Modulation Orders; Montreuil_01_0512", IEEE DRAFT; Montreuil-01_0512, IEEE-SA, Piscataway, NJ, USA, vol. 802.3epoc, Aug. 11, 2012, pp. 1-18, XP017752080, [retrieved on Aug. 8, 2011], pp. 6-17.

Bhatt, T et al., "Initial Synchronization for 802.16e Downlink," Fortieth Asilomar Conference on Signals, Systems and Computers, 2006. ACSSC '06. pp. 701-706, (Oct. 1, 2006); ACSSC.2006.354839; XP031081135, ISBN: 978-1-4244-0784-2.

Fertl, P. et al, "Channel estimation in wireless OFDM systems with irregular pilot distribution," IEEE Transactions on Signal Processing, vol. 58, No. 6, Jun. 2010.

Shatila, H. et al.,"Channel Estimation for WiMaX Systems Using Fuzzy Logic Cognitive Radio," Wireless and Optical Communications Networks, 2009. WOCN '09. IEEE IFIP International Conference, pp. 1, 6, 28-30, Apr. 2009.

Shen, Y. et al., "On Uplink Channel Estimation in WiMAX Systems", International Journal of Mobile Computing and Multimedia Communications, 2(2), pp. 67-77, Apr.-Jun. 2010.

* cited by examiner

800

---

In an OFDM transmitter:

Transmit successive pairs of OFDM symbols. Both OFDM symbols of a respective pair include pilot symbols on one or more groups of two subcarriers. The two subcarriers of each group are the same for both OFDM symbols and are symmetric about a center carrier frequency. The pilot symbols on the two subcarriers compose an orthogonal matrix. (802)

> The successive pairs include pilot symbols on respective subsets of a plurality of subcarriers. Both OFDM symbols of each of the successive pairs have pilot symbols on a respective subset of the plurality of subcarriers. The respective subsets of the plurality of subcarriers are distinct. (804)

> The respective subsets of the plurality of subcarriers include subcarriers that are evenly spaced on each side of a center carrier frequency and have mirror symmetry about the center carrier frequency. (805)

> The respective subsets of the plurality of subcarriers are staggered with respect to each other. (806)

---

In an OFDM receiver:

Receive the successive pairs of OFDM symbols. (808)

Estimate frequency responses at frequencies corresponding to the subcarriers carrying pilot symbols (e.g., to the respective subsets of the plurality of subcarriers). (810)

> Interpolate frequency responses for subcarriers not carrying pilot symbols (e.g., subcarriers not included in the respective subsets of the plurality of subcarriers), based on the estimated frequency responses. (812)

Compensate for signal impairment based at least in part on the estimated frequency responses. (814)

> Compensate for the signal impairment based further on the interpolated frequency responses. (816)

FIG. 8

PAIRED OFDM PILOT SYMBOLS

RELATED APPLICATIONS

This application claims priority to U.S. Provisional Patent Applications No. 61/618,624, titled "Receiver-Side Estimation of and Compensation for Signal Impairments," filed Mar. 30, 2012, and No. 61/719,326, titled "Receiver-Side Estimation of and Compensation for Signal Impairments," filed Oct. 26, 2012, both of which are hereby incorporated by reference in their entirety.

TECHNICAL FIELD

The present embodiments relate generally to communication systems, and specifically to communication systems that use pilot symbols to compensate for signal impairments.

BACKGROUND OF RELATED ART

Transceivers are sensitive to various signal impairments that affect the quality of the transmitted and received signals. Signal impairments may result from non-idealities in the RF front-ends of the transceivers. For example, mismatched active and passive elements (e.g., quadrature mixers, filters, digital-to-analog converters, and/or analog-to-digital converters) in the I and Q (in-phase and quadrature) signal paths introduce I/Q mismatch impairments in transmitted and received signals. I/Q mismatch, which also may be referred to as I/Q offset, is present in both the transmitter and receiver. In another example, carrier frequency offset in the receiver impairs received signals. Channel effects may also impair signals.

I/Q mismatch introduces an image signal that degrades signal quality. The signal-to-image ratio is typically around 25-30 dB, making I/Q mismatch an issue for systems targeting high spectral efficiency. I/Q mismatch is also frequency dependent, making I/Q mismatch an issue for wideband communication systems.

Accordingly, there is a need for techniques to estimate and compensate for signal impairments.

BRIEF DESCRIPTION OF THE DRAWINGS

The present embodiments are illustrated by way of example and are not intended to be limited by the figures of the accompanying drawings. Like numbers reference like elements throughout the drawings and specification.

FIG. 8 is a flowchart showing a method of communicating between an OFDM transmitter and an OFDM receiver in accordance with some embodiments.

DETAILED DESCRIPTION

Techniques are disclosed for transmitting and receiving pilot symbols that may be used to compensate for signal impairments.

In some embodiments, an orthogonal frequency-division multiplexing (OFDM) transmitter transmits successive pairs of OFDM symbols. The successive pairs include a first pair of OFDM symbols. First and second OFDM symbols of the first pair both include pilot symbols on two subcarriers that are symmetric about a center carrier frequency. The two subcarriers are the same for the first and second OFDM symbols. The pilot symbols on the two subcarriers for the first and second OFDM symbols compose an orthogonal matrix.

In some embodiments, an OFDM receiver receives successive pairs of OFDM symbols. The successive pairs include a first pair of OFDM symbols. First and second OFDM symbols of the first pair both include pilot symbols on two subcarriers that are symmetric about a center carrier frequency. The two subcarriers are the same for the first and second OFDM symbols. The pilot symbols on the two subcarriers for the first and second OFDM symbols compose an orthogonal matrix. The OFDM receiver estimates frequency responses at frequencies including the frequencies of the two subcarriers and compensates for signal impairment based at least in part on the estimated frequency responses.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1A:
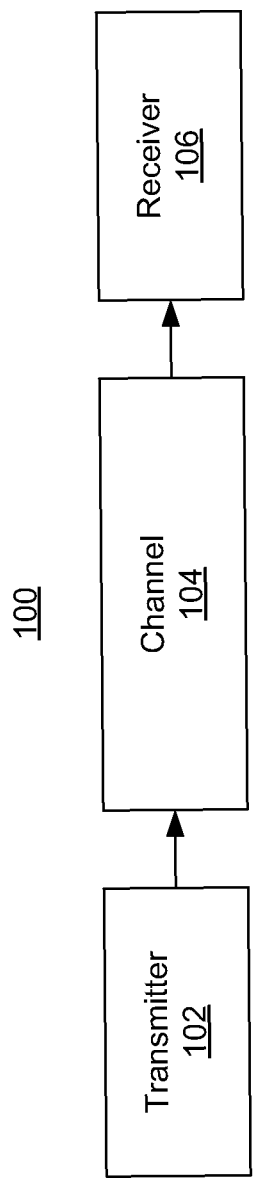
FIG. 1A illustrates a communications system in accordance with some embodiments.

FIG. 1A illustrates a communications system 100 in accordance with some embodiments. A transmitter 102 transmits a signal onto a channel 104, and a direct-conversion receiver 106 receives the signal from the channel 104. In some embodiments, the channel 104 is wireless. In other embodiments, the channel 104 is a wired link (e.g., a coaxial cable or other physical connection).

Figure 1B:
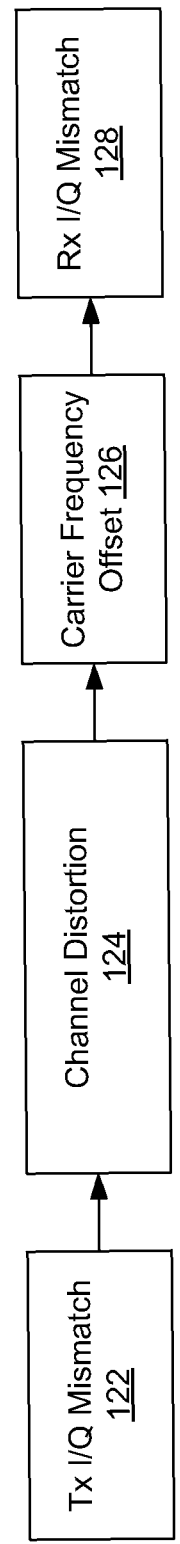
FIG. 1B illustrates sources of signal impairment in the communications system of FIG. 1A.

FIG. 1B illustrates sources of signal impairment, and thus signal degradation, in the communications system 100 of FIG. 1A. Transmitter-side (Tx) I/Q mismatch 122 in the transmitter 102 causes signal impairment, as does receiver-side (Rx) I/Q mismatch 128 in the receiver 106. The channel 104 introduces channel distortion 124, which may be linear distortion. Carrier frequency offset 126 in the receiver 106, which results from the frequency of a local oscillator in the receiver 106 differing from the frequency of a corresponding local oscillator in the transmitter 102, also causes signal impairment. In some embodiments, channel distortion 124 includes multi-path effects and Additive White Gaussian Noise (AWGN).

Figure 2A:
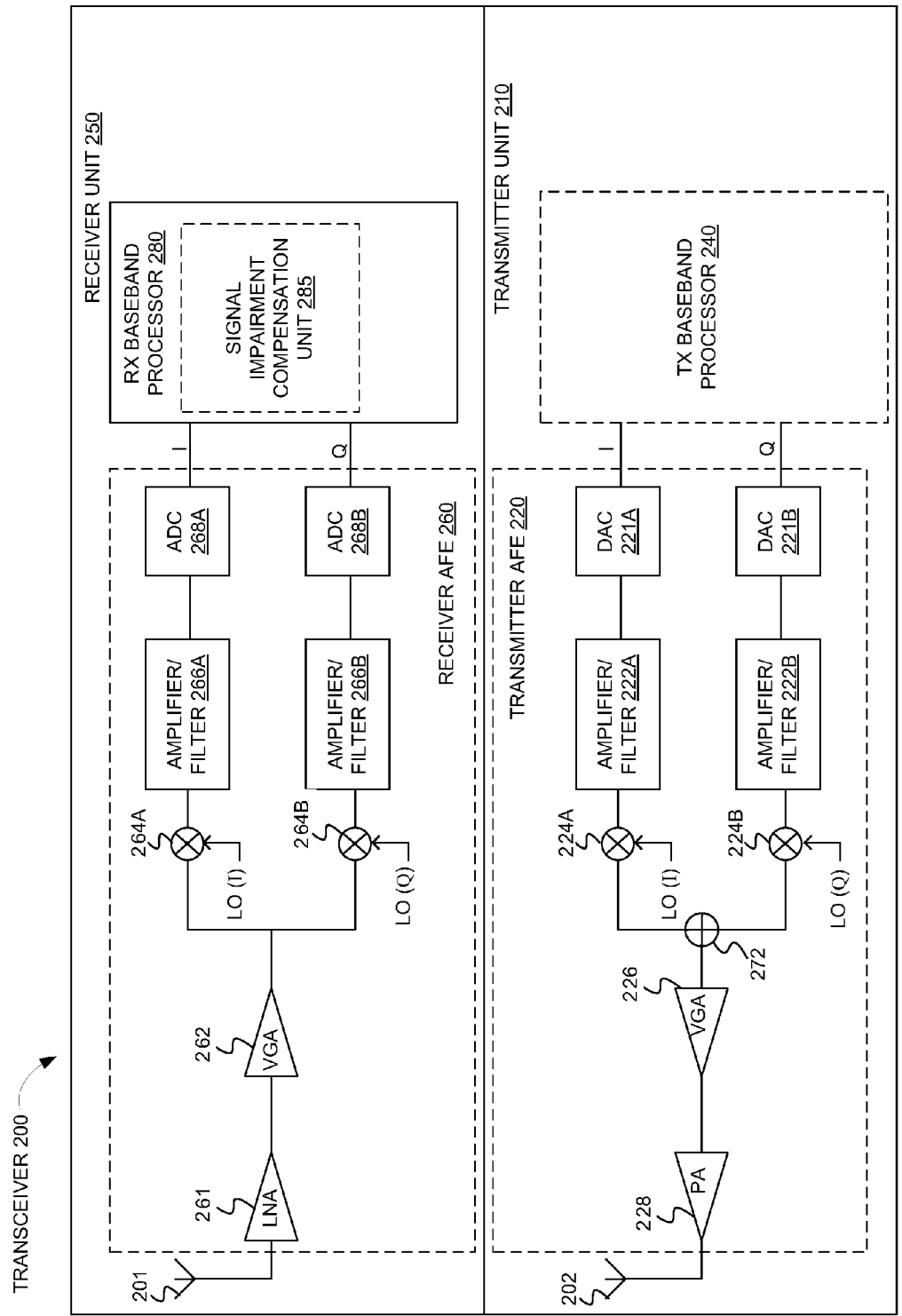
FIG. 2A is a block diagram of a direct-conversion transceiver in accordance with some embodiments.

FIG. 2A is a block diagram of a direct-conversion transceiver 200 using quadrature amplitude modulation (QAM) in accordance with some embodiments. The transceiver 200 may be included within a communication device (e.g., communication device 500, FIG. 5), such as a wireless (e.g., WLAN) device or a device with a wired network connection. As illustrated, the transceiver 200 includes a transmitter unit 210 and a receiver unit 250. The transmitter unit 210 of a first transceiver 200 corresponds to the transmitter 102 (FIG. 1A) and the receiver unit 250 of a second transceiver 200 corresponds to the receiver 106 (FIG. 1A), where the first transceiver 200 and second transceiver 200 are separated by the channel 104 (FIG. 1A).

In some embodiments, the transmitter unit 210 includes an antenna 202, a transmitter analog front end (AFE) 220, and a transmitter baseband processor 240. The receiver unit 250 includes an antenna 201, a receiver AFE 260, and a receiver baseband processor 280. In some embodiments, the receiver baseband processor 280 includes a signal impairment compensation unit 285 for estimating and compensating for signal impairments introduced both in the transmitter (e.g., transmitter 102, FIG. 1A) and receiver (e.g., receiver 106, FIG. 1A).

In the example of FIG. 2A, the transmitter AFE 220 includes a digital-to-analog converter (DAC) 221A for the I signal path, amplifier/filter circuitry 222A for the I signal path, a local oscillator (LO) mixer 224A for the I signal path, a DAC 221B for the Q signal path, amplifier/filter circuitry 222B for the Q signal path, an LO mixer 224B for the Q signal path, a combiner 272, a variable gain amplifier (VGA) 226, and a power amplifier (PA) 228. The mixers 224A and 224B up-convert the I and Q signals from baseband directly to the carrier frequency by mixing the I and Q signals with local oscillator signals LO(I) and LO(Q), where the frequency of the local oscillator signal is the carrier frequency. Mismatch between mixers 224A and 224B, between amplifiers/filters 222A and 222B, and/or between DACs 221A and 221B results in transmitter-side I/Q mismatch. The combiner 272 combines the up-converted I and Q signals.

The receiver AFE 260 includes a low-noise amplifier (LNA) 261, a VGA 262, an LO mixer 264A for the I signal path, amplifier/filter circuitry 266A for the I signal path, an analog-to-digital converter (ADC) 268A for the I signal path, an LO mixer 264B for the Q signal path, amplifier/filter circuitry 266B for the Q signal path, and an ADC 268B for the Q signal path. The mixers 264A and 264B directly down-convert the received signal into baseband I and Q signals by mixing the received signal with local oscillator signals LO(I) and LO(Q), where the frequency of the local oscillator signals (as generated by a local oscillator, not shown) is ideally the carrier frequency. Mismatch between mixers 264A and 264B, between amplifiers/filters 266A and 266B, and/or between ADCs 268A and 268B results in receiver-side I/Q mismatch. A difference between the frequency of the local oscillator signals in the receiver unit 250 of a receiver 106 (FIG. 1A) and the corresponding frequency of local oscillator signals in the transmitter unit 210 of a transmitter 102 (FIG. 1A) results in carrier frequency offset.

The components described with reference to FIG. 2A are exemplary only. In various embodiments, one or more of the components described may be omitted, combined, or modified, and additional components may be included. For instance, in some embodiments, the transmitter unit 210 and receiver unit 250 may share a common antenna, or may have various additional antennas and transmitter/receiver chains. In other embodiments, there may be no antenna; instead, the transmitter unit 210 and receiver unit 250 connect to a wired link. In some implementations, the transceiver 200 may include less or more filter and/or amplifier circuitry (e.g., blocks 222 and 266 of FIG. 2A).

Figure 2B:
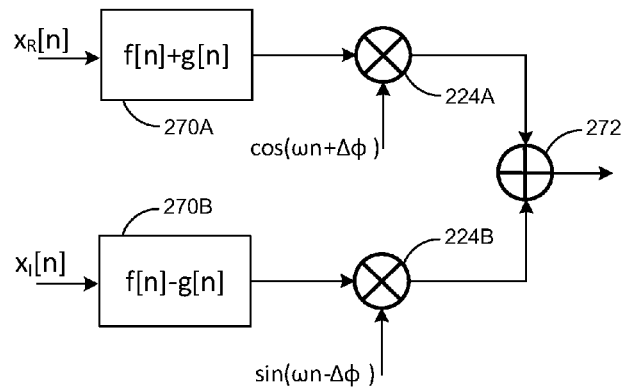
FIGS. 2B-2E are block diagrams illustrating signal impairments in accordance with some embodiments.

Attention is now directed to mathematical modeling of I/Q mismatch. FIG. 2B illustrates I/Q mismatch in a transmitter front end (e.g., transmitter AFE 220, FIG. 2A) in accordance with some embodiments. A signal component $x_R[n]$ is provided to the I signal path, which includes components 270A (e.g., DAC 221A and amplifier/filter 222A, FIG. 2A) and a mixer 224A. A signal $x_I[n]$ is provided to the Q signal path, which includes components 270B (e.g., DAC 221B and amplifier/filter 222B, FIG. 2A) and a mixer 224B. (The R and I subscripts refer to real and imaginary components, and thus respectively to the I and Q components, of a signal $x[n]$.) The signal path components 270A and 270B have corresponding functions $f[n]+g[n]$ and $f[n]-g[n]$, respectively, where $f[n]$ is common between the components 270A and 270B and $g[n]$ includes an amplitude mismatch (e.g., a frequency-dependent amplitude mismatch) between components 270A and 270B. A phase mismatch $\Delta\phi$ is introduced during up-conversion by mixers 224A and 224B. The I/Q mismatch of FIG. 2B thus is represented by $g[n]$ and $\Delta\phi$. The combiner 272 combines the up-converted I and Q signal to generate an RF transmitted signal.

The baseband equivalent of the RF transmitted signal, as affected by the I/Q mismatch of FIG. 2B, is $$r[n]=[\cos\Delta\phi(f[n]+g[n])*x_R[n]-\sin\Delta\phi(f[n]-g[n])*x_I[n]]+j[-\sin\Delta\phi(f[n]+g[n])*x_R[n]+\cos\Delta\phi(f[n]-g[n])*x_I[n]]$$

With some change in notation, this expression may be written in matrix form as $$\begin{bmatrix} r_R[n] \\ r_I[n] \end{bmatrix} = \begin{bmatrix} \cos\Delta\phi(f[n]+g[n]) & -\sin\Delta\phi(f[n]-g[n]) \\ -\sin\Delta\phi(f[n]+g[n]) & \cos\Delta\phi(f[n]-g[n]) \end{bmatrix} * \begin{bmatrix} x_R[n] \\ x_I[n] \end{bmatrix}$$

Expanding the matrix results in $$\begin{bmatrix} r_R[n] \\ r_I[n] \end{bmatrix} = \begin{bmatrix} f[n]\cos\Delta\phi & g[n]\sin\Delta\phi \\ -g[n]\sin\Delta\phi & f[n]\cos\Delta\phi \end{bmatrix} * \begin{bmatrix} x_R[n] \\ x_I[n] \end{bmatrix} + \begin{bmatrix} g[n]\cos\Delta\phi & f[n]\sin\Delta\phi \\ -f[n]\sin\Delta\phi & g[n]\cos\Delta\phi \end{bmatrix} * \begin{bmatrix} x_R[n] \\ -x_I[n] \end{bmatrix}$$

This equation corresponds to the following relation in complex notation:

$$r[n]=(f[n]\cos\Delta\phi-jg[n]\sin\Delta\phi)*x[n]+(g[n]\cos\Delta\phi-jf[n]\sin\Delta\phi)*x*[n]$$

If we define $$a[n]=f[n]\cos\Delta\phi-jg[n]\sin\Delta\phi$$

$$b[n]=g[n]\cos\Delta\phi-jf[n]\sin\Delta\phi$$

then we can write compactly $$r[n]=a[n]*x[n]+b[n]*x*[n]$$

As this result indicates, I/Q mismatch causes interference between I and Q components in the time domain. Equivalently, I/Q mismatch causes interference between mirror frequencies in the frequency domain, as shown by transforming the equation for r[n] into the frequency domain:

$$R(f)=A(f)X(f)+B(f)X*(-f).$$

I/Q mismatch can be perfectly compensated in the frequency domain via the following linear combination of the signal R(f) and its conjugate:

$$Y(f) = A*(-f)R(f) - B(f)R*(-f)$$
$$= [A*(-f)A(f) - B*(-f)B(f)]X(f)$$

where $\tilde{H}(f)=A^*(-f)A(f)-B^*(-f)B(f)$ is the equivalent transmitter shaping filter, which acts as a scaling factor to be corrected for. Dividing Y(f) by $\tilde{H}(f)$ recovers the original signal X(f).

This expression for the compensated signal Y(f) can be simplified by expressing complex signals in terms of their real and imaginary parts. Also, it is possible to define an alternative correction formula, $$Y(f) = R(f) - \frac{B(f)}{A^*(-f)}R*(-f)$$
$$= A(f)\left(1 - \frac{B(f)B^*(-f)}{A(f)A^*(-f)}\right)X(f)$$

Note that the equivalent shaping filter is different in this case.

If the I/Q mismatch is small, we can approximate f[n]≈1, sin Δφ≈Δφ, cos Δφ≈1, g[n] sin Δφ≈0, so that the complex envelope of the transmitted signal reads $$r[n]=x[n]+b[n]*x*[n],$$

where b[n]=g[n]−jΔφ. Also, the interference due to I/Q mismatch can be subtracted directly as y[n]=r[n] b[n]*x*[n].

The above mathematics model I/Q mismatch in the transmitter (e.g., transmitter 102, FIG. 1A). Receiver-side I/Q mismatch (e.g., in the receiver 106, FIG. 1A) may be modeled in the same fashion.

Assuming the only sources of distortion in the communication system are transmitter (Tx) I/Q mismatch, receiver (Rx) I/Q mismatch, and multi-path effects in the channel, the received signal in the frequency domain is $$Z(f)=\tilde{A}(f)X(f)+\tilde{B}(f)X*(-f)+A_{Rx}W(f)+B_{Rx}(f)W*(-f)$$

where $$\tilde{A}(f)=A_{Rx}(f)H(f)A_{Tx}(f)+B_{Rx}(f)H^*(-f)B_{Tx}^*(-f)$$

$$\tilde{B}(f)=A_{Rx}(f)H(f)B_{Tx}(f)+B_{Rx}(f)H^*(-f)A_{Tx}^*(-f).$$

W(f) is the spectrum of the additive Gaussian noise and H(f) is the frequency response of the channel. (H(f) is thus unrelated to $\tilde{H}(f)$). The corrected signal $\hat{Z}(f)$ is defined as $$\hat{Z}(f) = X(f) - \frac{\tilde{B}(f)}{\tilde{A}^*(-f)}X^*(-f)$$

After straightforward calculations, it can be shown that the corrected signal reads $$\hat{Z}(f) = \tilde{A}(f)\left(1 - \frac{\tilde{B}(f)\tilde{B}^*(-f)}{\tilde{A}(f)\tilde{A}^*(-f)}\right)X(f) - \tilde{W}(f)$$

where $\tilde{W}(f)$ is the equivalent noise after the correction filter has been applied.

In some embodiments, transmitted signals are narrowband signals. For narrowband signals, the filters in the I and Q signal paths (e.g., filters 222A-B and 266A-B, FIG. 2A) function as scalar multipliers. For example, functions a[n] and b[n] reduce to scalars a and b. Also, signal impairments due to multi-path effects in the channel may be neglected in narrowband embodiments.

Figure 2C:
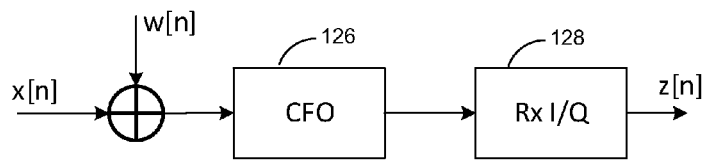

FIG. 2C illustrates signal impairments in a system (e.g., system 100, FIG. 1A) in which the received signal is affected by AWGN, carrier frequency offset 126, and receiver-side I/Q mismatch 128. Noise w[n] is mixed into the signal x[n] in the channel.

The received sampled signal z[n] can be expressed as $$z[n]=a[e^{j\Delta\omega n}x[n]]+b[e^{-j\Delta\omega n}x*[n]]+aw[n]+bw*[n]$$

where Δω is the carrier frequency offset (CFO) 126. The Rx I/Q mismatch 128 creates two different components rotating in opposite direction.

There are algorithms for CFO estimation based on the autocorrelation of the received signal, $r_{zz}[M]=z[n+M]z^*[n]$. The autocorrelation at lag M for the received signal affected by Rx I/Q mismatch 128 is $$r_{zz}[M]=|a|^2|x[n]|^2e^{j\Delta\omega M}+|b|^2|x[n]|^2e^{-j\Delta\omega M}+ab^*e^{j2\Delta\omega(n+M)}(x[n])^2+a^*be^{-j2\Delta\omega(n+M)}(x^*[n])^2$$

The second term significantly degrades the accuracy of CFO estimation based on autocorrelation of the received signal.

However, the CFO 126 may be estimated using other estimation techniques. For example, the CFO 126 may be estimated using classical non-linear least squares (NLS) techniques in receivers that process multiple symbols at a time (e.g., when the system employs a repeating training sequence or a cyclic prefix of an OFDM symbol, which repeats twice and changes from OFDM symbol to OFDM symbol).

Once Δω is known (or estimated), the (scalar) I/Q mismatch parameters a, b may be estimated. Defining $\tilde{z}[n]=e^{j\Delta\omega n}x[n]$, we can write the following matrix equation:

$$\begin{bmatrix} z[n] \\ z[n+1] \end{bmatrix} = \begin{bmatrix} \tilde{x}[n] & \tilde{x}*[n] \\ \tilde{x}[n+1] & \tilde{x}*[n+1] \end{bmatrix}\begin{bmatrix} a \\ b \end{bmatrix} + \begin{bmatrix} \tilde{w}[n] \\ \tilde{w}[n+1] \end{bmatrix}$$

The I/Q imbalance parameters can then be estimated by inverting the 2×2 system matrix in this equation.

The accuracy of the estimate of the I/Q mismatch parameters can be improved by stacking samples received over a whole period of M samples. Defining the input signal vector $\tilde{x}[n]=[\tilde{x}[n]\ \tilde{x}[n+1]\ \ldots\ \tilde{x}[n+M-1]]$ and the received signal vector $z[n]=[z[n]\ z[n+1]\ \ldots\ z[n+M-1]]$, the received signal vector may be rewritten as $$z[n] = [\tilde{x}[n] \quad \tilde{x}^*[n]] \begin{bmatrix} a \\ b \end{bmatrix} + \tilde{w}[n]$$

Solving for a, b now entails the inversion of an M×2 matrix. However, because of the linearity of the problem, classical low-complexity adaptive filtering techniques, such as least mean squares (LMS), may be used.

Once the I/Q mismatch parameters a, b have been found, the Rx I/Q mismatch 128 can then be corrected by a linear combination of z[n] and z*[n], $$\hat{z}[n] = a^*z[n] - bz^*[n]$$
$$= e^{j\Delta\omega n}(|a|^2 - |b|^2)x[n] + w[n]$$

As this equation indicates, the CFO 126 can now be corrected using phase rotation.

Figure 3A:
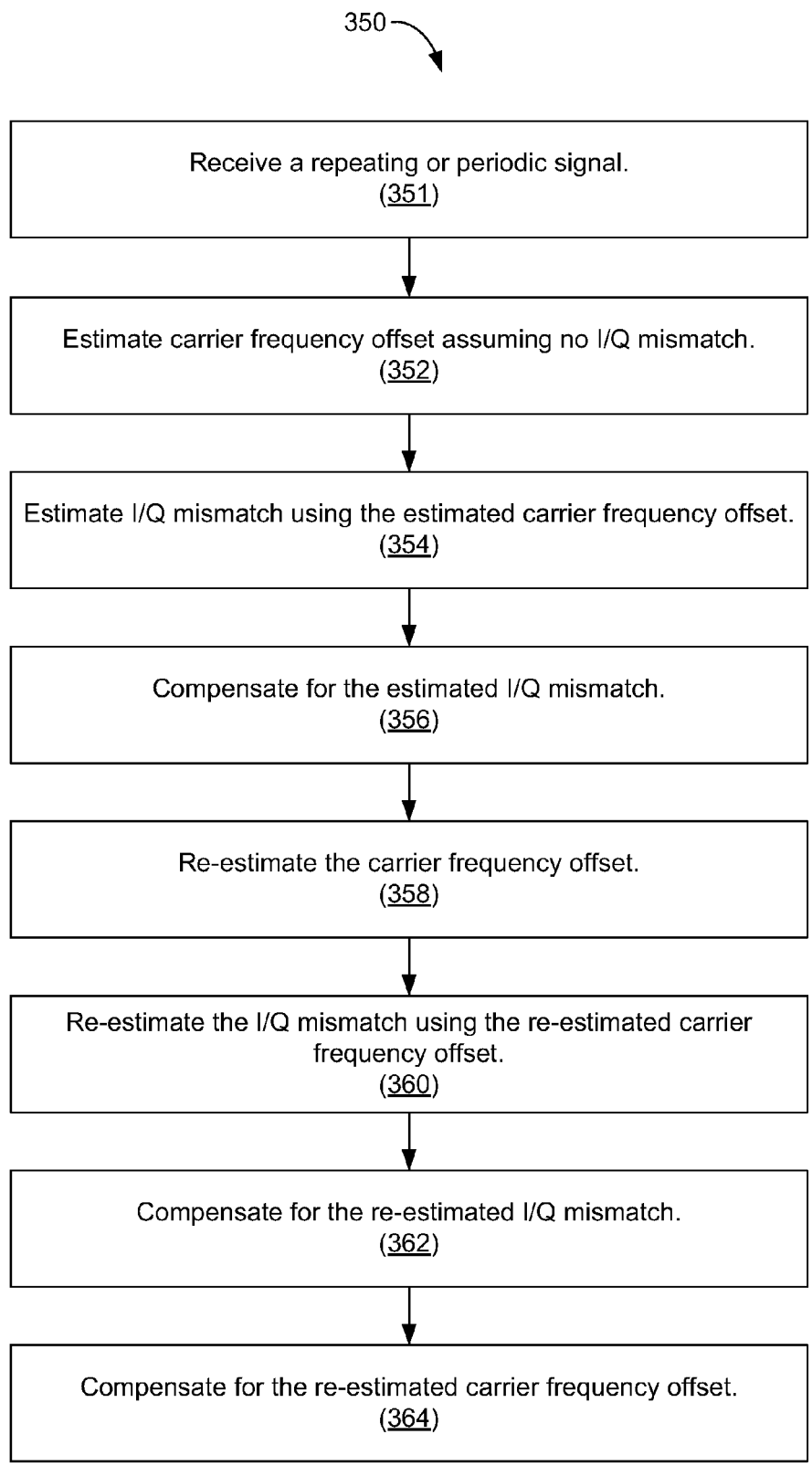
FIG. 3A is a flowchart illustrating a method of estimating and compensating for signal impairments in accordance with some embodiments.

In some embodiments, iterative estimations of the CFO 126 and Rx I/Q mismatch 128 are performed. FIG. 3A illustrates a method 350 of iteratively estimating CFO and I/Q mismatch. The method 350 is performed in a receiver (e.g., receiver unit 250 of transceiver 200, FIG. 2A) in accordance with some embodiments.

In the method 350, a repeating or periodic signal is received (351). In some embodiments, the signal is a repeating training sequence. In some embodiments, the signal is a narrowband signal. In some embodiments, the signal is a cyclic prefix of an OFDM symbol.

CFO (e.g., CFO 126, FIG. 2C) is estimated (352) based on the signal assuming no I/Q mismatch. For example, the CFO is estimated using an autocorrelation technique; the iterative nature of the method 350 accommodates the inaccuracy associated with using autocorrelation. Alternatively, the CFO is estimated using an NLS technique based on the signal. Using the estimated CFO, I/Q mismatch (e.g., receiver-side I/Q mismatch 128, FIG. 2C) is estimated (354). The estimated I/Q mismatch is compensated for (356), and the CFO is then re-estimated (358). The I/Q mismatch is re-estimated (360) using the re-estimated CFO and is compensated for (362), and the re-estimated CFO is compensated for (364).

While the method 350 includes a number of operations that appear to occur in a specific order, it should be apparent that the method 350 can include more or fewer operations. An order of two or more operations may be changed and two or more operations may be combined into a single operation.

In some embodiments, the method 350 is an example of a first phase of a two-phase process of estimating and compensating for signal impairments. In the first phase, estimation of and compensation for receiver-side I/Q mismatch and carrier frequency offset are performed. In a subsequent second phase, estimation of and compensation for transmitter-side I/Q mismatch and channel distortion (e.g., linear channel distortion) are performed. Impairments 126 and 128 (FIG. 1B) thus are estimated and compensated for in the first phase, and impairments 122 and 124 (FIG. 1B) are estimated and compensated for in the second phase. This two-phase approach provides for computational simplicity compared to approaches that jointly estimate and correct for transmitter-side I/Q mismatch, receiver-side I/Q mismatch, channel distortion, and carrier frequency offset. The two-phase approach thus is easier to implement than joint approaches.

In some embodiments, a two-phased approach is used in communications systems in which the physical layer employs a repetitive known signal (e.g., a training sequence, preamble, or prefix). For example, the two-phased approach may be implemented in systems compatible with one of the IEEE 802.11 family of protocols. In some embodiments, a two-phased approach is used in communications systems that perform multicarrier modulation based on orthogonal frequency-division multiplexing (OFDM). Examples include systems compatible with one of the IEEE 802.11 family of protocols and systems compatible with the 3GPP E-UTRAN (LTE) standard.

Figure 3B:
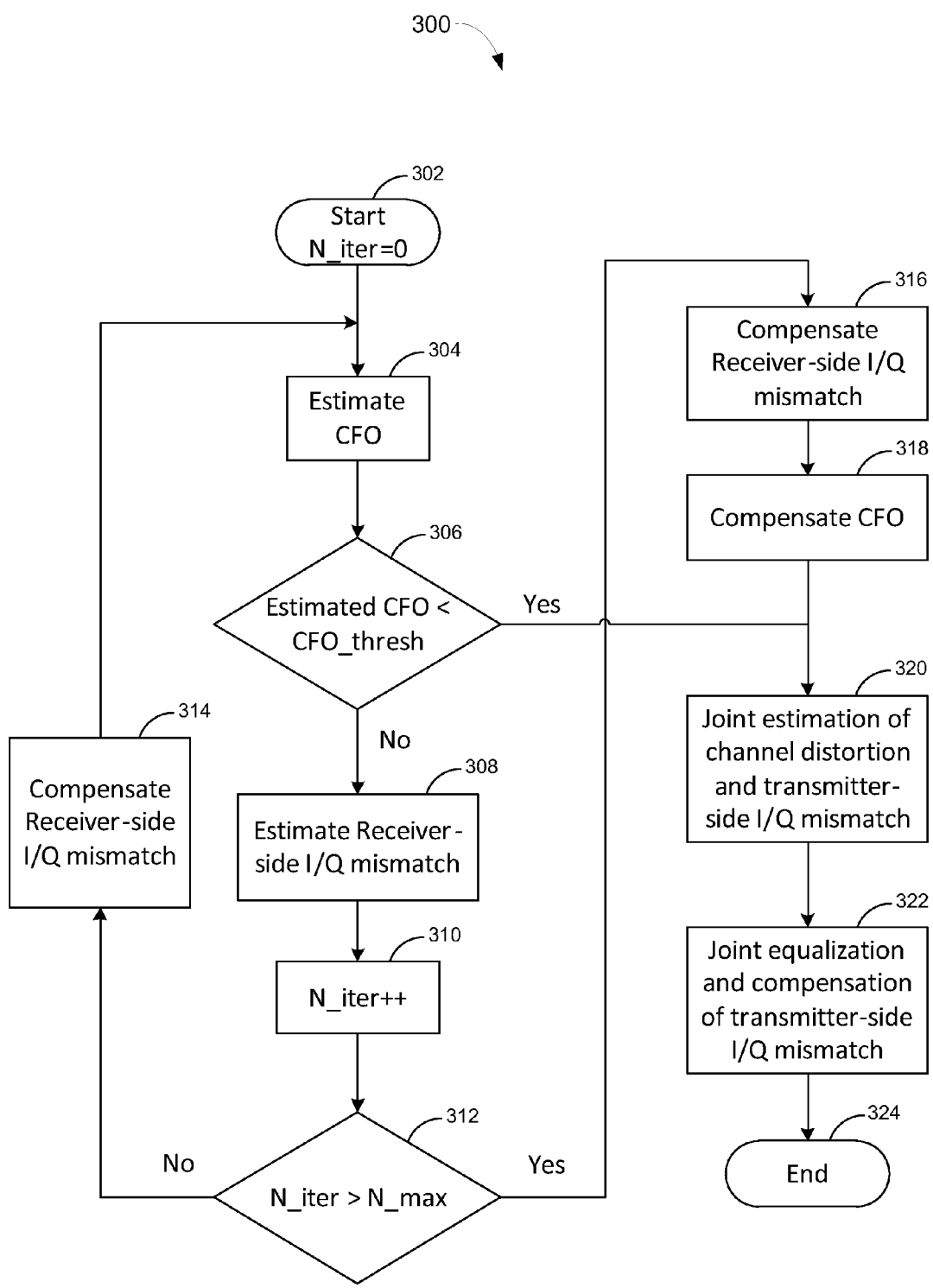
FIG. 3B is a flowchart illustrating a two-phased method of estimating and compensating for signal impairments in accordance with some embodiments.

FIG. 3B is a flowchart illustrating a two-phased method 300 of estimating and compensating for signal impairments in accordance with some embodiments. The method 300 is performed in a receiver (e.g., receiver 106, FIG. 1A). In some embodiments, the method 300 is performed by the receiver baseband processor 280 (FIG. 2A) (e.g., by the signal impairment compensation unit 285, FIG. 2A). In some embodiments, the method 300 uses a training signal or dedicated repeating preamble but in general the method 300 is not so limited. The method 300 thus is performed in the digital domain in baseband in accordance with some embodiments. During phase one, carrier frequency offset (e.g., CFO 126, FIG. 2C) and receiver-side I/Q mismatch (e.g., Rx I/Q mismatch 128, FIG. 2C) are repeatedly estimated for a predefined number of iterations. Phase one is terminated, however, if the estimated carrier frequency offset is determined to be less than a specified threshold, even if the predefined number of iterations has not been completed. In response to a determination that the estimated carrier frequency offset is less than the specified threshold determination, the method 300 proceeds to phase two, in which channel distortion is estimated and equalized and transmitter-side I/Q mismatch is estimated and compensated for.

At the start 302 of the method 300, an iteration counter (N_iter) is set to zero. An estimate of carrier frequency offset is made (304) using any known technique. For example, non-linear least-squares (NLS) techniques that process multiple symbols at a time (e.g., from a repeating training sequence or the cyclic prefix of an OFDM symbol) may be used to estimate the carrier frequency offset. Alternately, autocorrelation techniques may be used. In some embodiments, the estimation of carrier frequency offset is made assuming no receiver-side I/Q mismatch. For example, the estimation of carrier frequency offset is agnostic toward receiver-side I/Q mismatch.

The estimated carrier frequency offset is compared (306) to a predefined threshold (CFO_thresh). The predefined threshold is system-dependent. In some embodiments implemented in OFDM systems, the predefined threshold is set to be comparable to the sub-carrier spacing.

If the estimated carrier frequency offset is less than the predefined threshold (306—Yes), phase one is terminated and the method 300 proceeds to operations 320 and 322 of phase two (described below).

If the estimated carrier frequency offset is not less than the predefined threshold (306—No), an estimate is made (308) of the receiver-side I/Q mismatch. This estimate is made, for example, as described below with regard to FIGS. 4A-4D and equations (1)-(5).

The iteration counter is incremented (310) and compared (312) to the predefined number of iterations (N_max). In some embodiments, N_max equals two. In some embodiments, N_max has a value in the range of 2-10.

If the incremented iteration counter is not greater than N_max (312—No), compensation is performed (314) for the receiver-side I/Q mismatch estimated at 308, and the method 300 returns to operation 304.

If the incremented iteration counter is greater than N_max (312—Yes), compensation is performed (316) for the receiver-side I/Q mismatch estimated at 308, and compensation is performed (318) for carrier frequency offset estimated at 304. The carrier frequency offset compensation is performed using any known technique (e.g., phase rotation). At this point, phase one is complete. The estimation operations 304 and 308 and compensation operations 314/316 thus are performed a number of times equal to N_max, assuming that the estimated carrier frequency offset is not determined to be less than the predefined threshold during one of the iterations. Note that if N_max=2 and the determination at 306 is "No" in both iterations, phase one is an example of the method 350 (FIG. 3A). If N_max (i.e., the predefined number of iterations) is greater than two, portions of phase one are an example of the method 350 (FIG. 3A): for example, operations 352-356 of the method 350 may correspond to a first iteration and operations 358-362 of the method 350 may correspond to a final iteration.

In phase two of method 300, a joint estimate is made (320) of channel distortion (e.g., distortion 124, FIG. 1B) and transmitter-side I/Q mismatch (e.g., mismatch 122, FIG. 1B). Joint equalization of the estimated channel distortion and compensation for the estimated transmitter-side I/Q mismatch is performed (322), at which point the method 300 ends (324). Equalization of channel distortion and compensation for transmitter-side I/Q mismatch thus are performed after receiver-side I/Q mismatch and carrier frequency offset have been compensated for in accordance with some embodiments. (Equalization of channel distortion compensates for the channel distortion.) In some embodiments, equalization of channel distortion and compensation for transmitter-side I/Q mismatch are performed in the frequency domain, as described below.

While the method 300 includes a number of operations that appear to occur in a specific order, it should be apparent that the method 300 can include more or fewer operations. An order of two or more operations may be changed and two or more operations may be combined into a single operation.

Figure 2D:
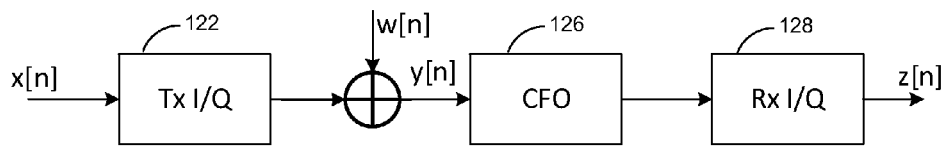
Figure 4A:
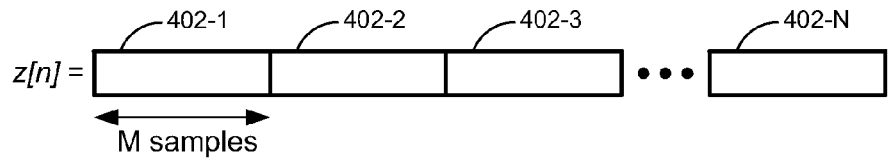
FIGS. 4A-4D illustrate a periodic signal used for receiver-side I/Q mismatch estimation and compensation in accordance with some embodiments.

Attention is now directed to estimating and compensating for receiver-side I/Q mismatch. A repeating or periodic narrowband signal (e.g., a training signal) z[n] is used, as shown in FIG. 2D and FIG. 4A in accordance with some embodiments, and the carrier frequency offset is estimated beforehand (e.g., the CFO is estimated in operation 304, FIG. 3B, prior to estimating the receiver-side I/Q mismatch in operation 308). The variable n indexes samples of the signal. Each period 402 of the signal z[n] includes M samples, as shown in FIG. 4A, where M is an integer greater than or equal to one. For example, a first period 402-1 includes M samples, as does a second period 402-2, a third period 402-3, and an Nth period 402-N.

The signal z[n] may be expressed as:

$$z[n] = (a_{Rx}a_{Tx})e^{j\Delta\omega n}x[n] + (a_{Rx}b_{Tx})e^{j\Delta\omega n}x^*[n] + (b_{Rx}a_{Tx}^*)e^{-j\Delta\omega n}x^*[n] + (b_{Rx}b_{Tx}^*)e^{-j\Delta\omega n}x[n] + a_{Rx}w[n] + b_{Rx}w^*[n]$$

The received signal over two successive periods of length M is:

$$z[n] = a_{Rx}[e^{j\Delta\omega n}y[n]] + b_{Rx}[e^{-j\Delta\omega n}y^*[n]] + \tilde{w}[n]$$

$$z[n+M] = a_{Rx}e^{j\Delta\omega M}[e^{j\Delta\omega n}y[n]] + b_{Rx}e^{-j\Delta\omega M}[e^{-j\Delta\omega n}y^*[n]] + \tilde{w}[n+M]$$

The signal y[n] includes the (unknown) transmitter-side I/Q mismatch 122 (FIG. 2D).

Receiver-side I/Q mismatch can be compensated by performing a linear transformation involving a scalar correction factor q to generate a compensated received signal $\hat{z}[n]$. Specifically:

$$\hat{z}[n] = [\, z[n] \;\; z^*[n] \,] \begin{bmatrix} 1 \\ q \end{bmatrix} \quad (1)$$

where z*[n] is the complex conjugate of z[n].

Assuming perfect compensation and thus perfect correction, $$q = \frac{-b_{RX}}{a_{Rx}^*}$$

and the corrected received signal over two successive training sequences reads $$\hat{z}[n] = a_{Rx}\left(1 - \frac{|b_{Rx}|^2}{|a_{Rx}|^2}\right)e^{j\Delta\omega n}y[n] + a_{Rx}\left(1 - \frac{|b_{Rx}|^2}{|a_{Rx}|^2}\right)w[n]$$

$$\hat{z}[n+M] = a_{Rx}e^{j\Delta\omega M}\left(1 - \frac{|b_{Rx}|^2}{|a_{Rx}|^2}\right)e^{j\Delta\omega n}y[n] + a_{Rx}\left(1 - \frac{|b_{Rx}|^2}{|a_{Rx}|^2}\right)w[n+M]$$

Neglecting the noise and assuming perfect compensation for receiver-side I/Q mismatch, it holds that:

$$\hat{z}[n+M] = e^{j\Delta\omega M}\hat{z}[n] \quad (2)$$

where $\Delta\omega$ is the carrier frequency offset (e.g., as estimated in operation 304, FIG. 3B) in units of radians/sample. Relationship (2) thus holds that a compensated sample in a given period (e.g., period 402-2) equals the compensated sample in a previous period (e.g., period 402-1) multiplied by a phase factor determined by the product of the carrier frequency offset and the number of samples in a period.

Figure 4B:
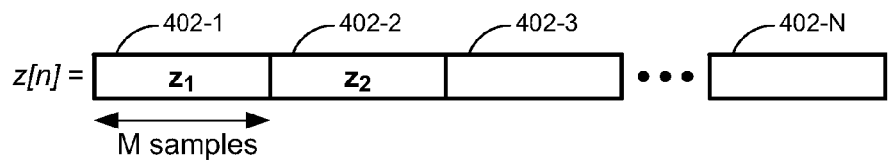

Relationship (2) holds for all samples within two successive periods. FIG. 4B illustrates samples in two successive periods, including a vector $z_1$ of samples in period 402-1 and a vector $z_2$ of samples in period 402-2. Relationship (2) holds between vectors $z_1$ and $z_2$, such that:

$$[\, z_2 \;\; z_2^* \,] \begin{bmatrix} 1 \\ q \end{bmatrix} = e^{j\Delta\omega M} [\, z_1 \;\; z_1^* \,] \begin{bmatrix} 1 \\ q \end{bmatrix} \quad (3)$$

Solving equation (3) for the correction factor q yields:

$$q = \frac{-(z_2^* - e^{j\Delta\omega M}z_1^*)^H (z_2 - e^{j\Delta\omega M}z_1)}{\|z_2^* - e^{j\Delta\omega M}z_1^*\|^2} \quad (4)$$

In equation (4), H refers to the Hermitian transpose operation (i.e., taking the transpose conjugate of the vector by transposing the vector and taking the complex conjugate of each element). The correction factor q is determined using equation (4) and is then used to determine the compensated received signal $\hat{z}[n]$ in accordance with equation (1).

Figure 4C:
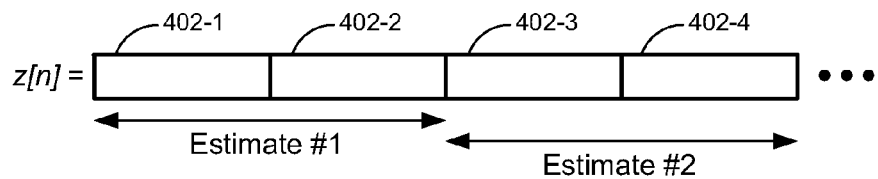

In some embodiments, accuracy of the receiver-side I/Q mismatch estimation is improved by averaging multiple estimates from adjacent periods. For example, a first estimate is made based on periods 402-1 and 402-2 and a second estimate is made based on periods 402-3 and 402-4, as illustrated in FIG. 4C in accordance with some embodiments. Each of the two estimates is made, for example, using equation (4). The first and second estimates are then averaged, and the resulting value of q is used to compensate for the receiver-side I/Q mismatch using equation (1).

Figure 4D:
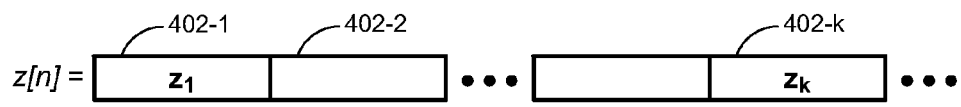

In some embodiments, conditioning of the problem of estimating the receiver-side I/Q mismatch is improved by using non-consecutive periods. Using non-consecutive periods helps to ensure a reasonably large value of the carrier frequency offset ($\Delta\omega$). FIG. 4D illustrates an example in which vectors $z_1$ and $z_k$ for respective non-consecutive periods 402-1 and 402-$k$ are used, where the index k indicates the separation between the two periods (i.e., there are k−1 periods between period 402-1 and period 402-$k$). In this example, equation (3) is modified to:

$$[z_k \;\; z_k^*]\begin{bmatrix}1\\q\end{bmatrix} = e^{j\Delta\omega k M}[z_1 \;\; z_1^*]\begin{bmatrix}1\\q\end{bmatrix} \quad (5)$$

Equation (5) is then solved for the correction factor q, and the resulting value of q is used to compensate for the receiver-side I/Q mismatch in accordance with equation (1).

In some embodiments, instead of using a periodic training signal, the cyclic prefix of an OFDM symbol is used to estimate the receiver-side I/Q mismatch. While the cyclic prefix changes from OFDM symbol to OFDM symbol, it repeats twice and thus may be considered a repeating signal.

Equations (1)-(5) describe performing estimation of and compensation for receiver-side I/Q mismatch in the time domain. In some embodiments, after time-domain compensation of receiver-side I/Q mismatch (e.g., in phase one of method 300, FIG. 3B), transmitter-side I/Q mismatch and channel distortion are compensated for in the frequency domain (e.g., in phase two of method 300, FIG. 3B). The frequency-domain compensation may also compensate for residual receiver-side I/Q mismatch that was not compensated for in the time domain. Frequency-domain compensation is performed, for example, in the receiver of an OFDM system.

In the frequency domain, OFDM transmissions may be modeled by a complex transmit symbol vector $x_c$, a complex diagonal channel matrix $H_c$, a complex receive symbol vector $y_c$, and a complex additive noise vector $n_c$:

$$y_c = H_c x_c + n_c.$$

An equivalent real-valued notation is:

$$y = Hx + n$$

where $$x = x_{cR} \otimes \begin{bmatrix}1\\0\end{bmatrix} + x_{cI} \otimes \begin{bmatrix}0\\1\end{bmatrix}$$

$$n = n_{cR} \otimes \begin{bmatrix}1\\0\end{bmatrix} + n_{cI} \otimes \begin{bmatrix}0\\1\end{bmatrix}$$

$$y = y_{cR} \otimes \begin{bmatrix}1\\0\end{bmatrix} + y_{cI} \otimes \begin{bmatrix}0\\1\end{bmatrix}$$

and $$H = H_{cR} \otimes \begin{bmatrix}1 & 0\\0 & 1\end{bmatrix} + H_{cI} \otimes \begin{bmatrix}0 & -1\\1 & 0\end{bmatrix}.$$

Figure 6:
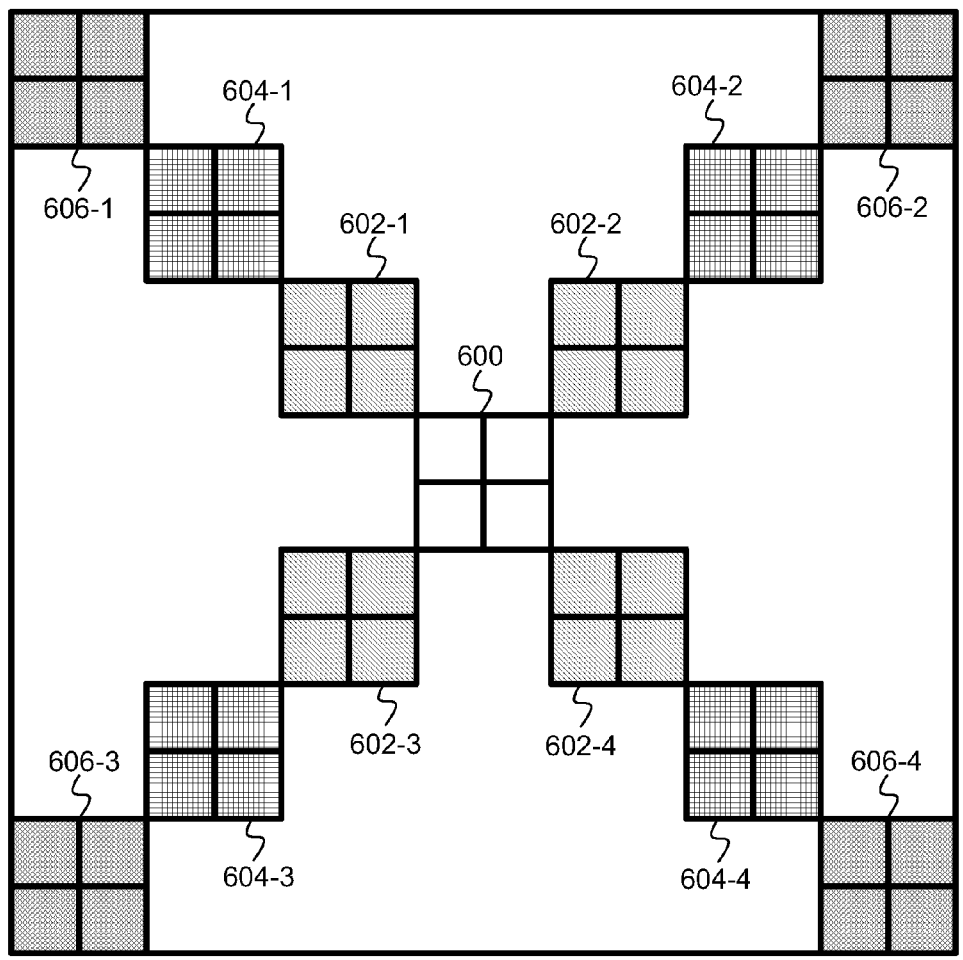
FIG. 6 illustrates a channel matrix used for frequency-domain signal impairment estimation and compensation in accordance with some embodiments.

Here, $\otimes$ denotes the Kronecker product. H becomes a block diagonal matrix with blocks of size 2×2, as illustrated in FIG. 6 in accordance with some embodiments. The real and imaginary parts of each entry are stacked on top of each other in x, y, and n.

Transmitter IQ mismatch and receiver IQ mismatch cause interference between a frequency f and its mirror frequency −f. The real-valued model allows us to redefine H such that it includes the modeling of transmitter IQ mismatch and receiver IQ mismatch. FIG. 6 illustrates the structure of the effective channel matrix H including transmitter IQ mismatch and receiver IQ mismatch. The interference between f and −f adds blocks on the main skew diagonal of H. In the center, the 2×2 matrix 600 corresponds to the zero frequency. There is no interference between symbols that are affected by entries with different fill patterns in the matrix. For example, symbols affected by entries 602-1 through 602-4 do not interfere with symbols affected by entries 600, 604-1 through 604-4, and 606-1 through 606-4, and so on. Therefore, it is sufficient to consider a submatrix composed of the entries marked with a single fill pattern in FIG. 6.

The transmitter IQ offsets and receiver IQ offsets are respectively modeled by $$\begin{bmatrix} \cos(\varphi_T) & A_T\sin(\varphi_T) & -A_T\cos(\varphi_T) & \sin(\varphi_T) \\ -A_T\sin(\varphi_T) & \cos(\varphi_T) & \sin(\varphi_T) & A_T\cos(\varphi_T) \\ -A_T\cos(\varphi_T) & \sin(\varphi_T) & \cos(\varphi_T) & A_T\sin(\varphi_T) \\ \sin(\varphi_T) & A_T\cos(\varphi_T) & -A_T\sin(\varphi_T) & \cos(\varphi_T) \end{bmatrix}$$

and $$\begin{bmatrix} \cos(\varphi_R) & -A_R\sin(\varphi_R) & A_R\cos(\varphi_R) & \sin(\varphi_R) \\ A_R\sin(\varphi_R) & \cos(\varphi_R) & \sin(\varphi_R) & -A_R\cos(\varphi_R) \\ -A_R\cos(\varphi_R) & \sin(\varphi_R) & \cos(\varphi_R) & A_R\sin(\varphi_R) \\ \sin(\varphi_R) & A_R\cos(\varphi_R) & -A_R\sin(\varphi_R) & \cos(\varphi_R) \end{bmatrix}$$

where $A_T/2$ and $A_R/2$ are respectively the transmitter and receiver amplitude offsets and $\phi_T/2$ and $\phi_R/2$ are respectively the transmitter and receiver phase offsets in terms of percent. Assuming that the frequency response is represented by the complex numbers $h_f$ and $h_{-f}$ we define a symmetric component $$h_s = (h_f + h_{-f})/2 = |h_s|(\cos(\phi_{cs}) + j\sin(\phi_{cs}))$$

and an asymmetric component $$h_a = (h_f - h_{-f})/2 = |h_a|(\cos(\phi_{ca}) + j\sin(\phi_{ca}))$$

Combining the transmitter IQ offset, the channel matrix, and the receiver IQ offset, we obtain $$Z = \begin{bmatrix} Z_1 & -Z_2 & Z_7 & Z_8 \\ Z_2 & Z_1 & Z_8 & -Z_7 \\ Z_3 & Z_4 & Z_5 & -Z_6 \\ Z_4 & -Z_3 & Z_6 & Z_5 \end{bmatrix}$$

$$= \begin{bmatrix} X_1 & -X_2 & X_3 & X_4 \\ X_2 & X_1 & X_4 & -X_3 \\ X_3 & X_4 & X_1 & -X_2 \\ X_4 & -X_3 & X_2 & X_1 \end{bmatrix} + \begin{bmatrix} Y_1 & -Y_2 & -Y_3 & -Y_4 \\ Y_2 & Y_1 & -Y_4 & Y_3 \\ Y_3 & Y_4 & -Y_1 & Y_2 \\ Y_4 & -Y_3 & -Y_2 & -Y_1 \end{bmatrix}$$

with $$X_1 = |h_s|[\cos(\phi_{cs})(1 + A_R A_T)\cos(\phi_T - \phi_R) - \sin(\phi_{cs})(A_T + A_R)\sin(\phi_T - \phi_R)],$$

$Y_1=|h_a|[\cos(\phi_{ca})(1-A_RA_T)\cos(\phi_T+\phi_R)-\sin(\phi_{ca})(A_T-A_R)\sin(\phi_T+\phi_R)]$, $X_2=|h_s|[\cos(\phi_{cs})(A_T-A_R)\sin(\phi_T+\phi_R)+\sin(\phi_{cs})(1-A_RA_T)\cos(\phi_T+\phi_R)]$, $Y_2=|h_a|[\cos(\phi_{ca})(A_T+A_R)\sin(\phi_T-\phi_R)+\sin(\phi_{ca})(1+A_RA_T)\cos(\phi_T-\phi_R)]$, $X_3=|h_s|[\cos(\phi_{cs})(A_T+A_R)\cos(\phi_T-\phi_R)-\sin(\phi_{cs})(1+A_RA_T)\sin(\phi_T+\phi_R)]$, $Y_3=|h_a|[\cos(\phi_{ca})(A_T-A_R)\cos(\phi_T+\phi_R)-\sin(\phi_{ca})(1-A_RA_T)\sin(\phi_T+\phi_R)]$, $X_4=|h_s|[\cos(\phi_{cs})(1-A_RA_T)\sin(\phi_T+\phi_R)+\sin(\phi_{cs})(A_T-A_R)\cos(\phi_T+\phi_R)]$, and $Y_4=|h_a|[\cos(\phi_{ca})+(1+A_RA_T)\sin(\phi_T-\phi_R)+\sin(\phi_{ca})(A_T+A_R)\cos(\phi_T-\phi_R)]$.

Note that X denotes the contribution due to $h_s$ and Y denotes the contribution due to $h_a$.

An estimate of H may be obtained by estimating the frequency response at certain frequencies and subsequently interpolating between these estimates. The estimated frequency responses are spaced closely enough with respect to the coherence bandwidth. The frequency response is jointly estimated for f and its mirror frequency –f. This is done using pilot symbols that are symmetric with respect to frequency zero. Considering Z we observe that eight parameters are to be estimated jointly. At least two OFDM symbols are used to get a valid estimate. Examples of valid pilot matrices include $$P = \begin{bmatrix} 1 & -1 \\ 0 & 0 \\ 1 & 1 \\ 0 & 0 \end{bmatrix},$$

$$P = \begin{bmatrix} 1 & 0 \\ 0 & 0 \\ 0 & 1 \\ 0 & 0 \end{bmatrix},$$

$$P = \begin{bmatrix} p_1 & -p_3 \\ p_2 & -p_4 \\ p_3 & p_1 \\ p_4 & p_2 \end{bmatrix} \quad (6)$$

or more generally where the first column specifies a symbol transmitted in time slot 1 and the second column specifies a symbol transmitted in time slot 2. Also, every entry in a respective column may be multiplied by –1 without changing the relevant properties. In some embodiments, the interpolation is done independently for the diagonal elements and the skew diagonal elements.

Assuming that P was transmitted, R=ZP is observed at the receiver. Based on P and $$R = \begin{bmatrix} r_1 & r_5 \\ r_2 & r_6 \\ r_3 & r_7 \\ r_4 & r_8 \end{bmatrix}$$

we construct the following matrices $$R_{eff} = \begin{bmatrix} r_1 & -r_2 & r_5 & -r_6 \\ r_2 & r_1 & r_6 & r_5 \\ r_3 & r_4 & r_7 & r_8 \\ r_4 & -r_3 & r_8 & -r_7 \end{bmatrix}$$

and the orthogonal pilot matrix $$P_{eff} = \begin{bmatrix} p_1 & -p_2 & -p_3 & p_4 \\ p_2 & p_1 & -p_4 & -p_3 \\ p_3 & p_4 & p_1 & p_2 \\ p_4 & -p_3 & p_2 & -p_1 \end{bmatrix}.$$

From this we can estimate Z:

$$Z_{est} = R_{eff} P_{eff}^H (P_{eff} * P_{eff}^H)^{-1}. \quad (7)$$

Note that $(P_{eff} * P_{eff}^H)^{-1}$ is a diagonal matrix and thus can be represented as a scaling factor. To apply a zero-forcing approach, $Z_{est}$ is inverted. The inversion of Z has the same complexity as the inversion of a 2×2 complex matrix even though there does not exist a complex-valued equivalent. Hence, no inversions of arbitrary 4×4 matrices are involved in compensating for Z.

This frequency-domain compensation technique includes the estimation and correction of a frequency-dependent IC) offset. In particular, frequency-selective IC) offset compensation is performed at the edge frequencies.

Also, this frequency-domain compensation technique assumes no carrier frequency offset (e.g., as for the phase two of method 300, FIG. 3B). If there were a carrier frequency offset, H would result in a fully occupied matrix, which reflects the inter-subcarrier interference caused by the carrier frequency offset and makes CFO compensation in the frequency domain computationally inefficient. Accordingly, in some embodiments CFO is corrected in the time domain prior to the conversion of the received signal into the frequency domain (e.g., in phase one of method 300, FIG. 3B).

In some embodiments, correction of the carrier frequency offset involves correction of the (estimated) receiver IQ offset (e.g., as illustrated in methods 350 and 300, FIGS. 3A and 3B). For example, method 350 or 300 (FIGS. 3A and 3B) is used to correct the carrier frequency offset and receiver IQ mismatch if a carrier frequency offset is present. Frequency-domain estimation and correction are then used to compensate for the influence of the channel, transmitter IQ offset, and any residual receiver IQ offset. If no carrier frequency offset is present, a joint estimate of the channel, transmitter IQ offset, and receiver IQ offset is obtained.

Figure 7:
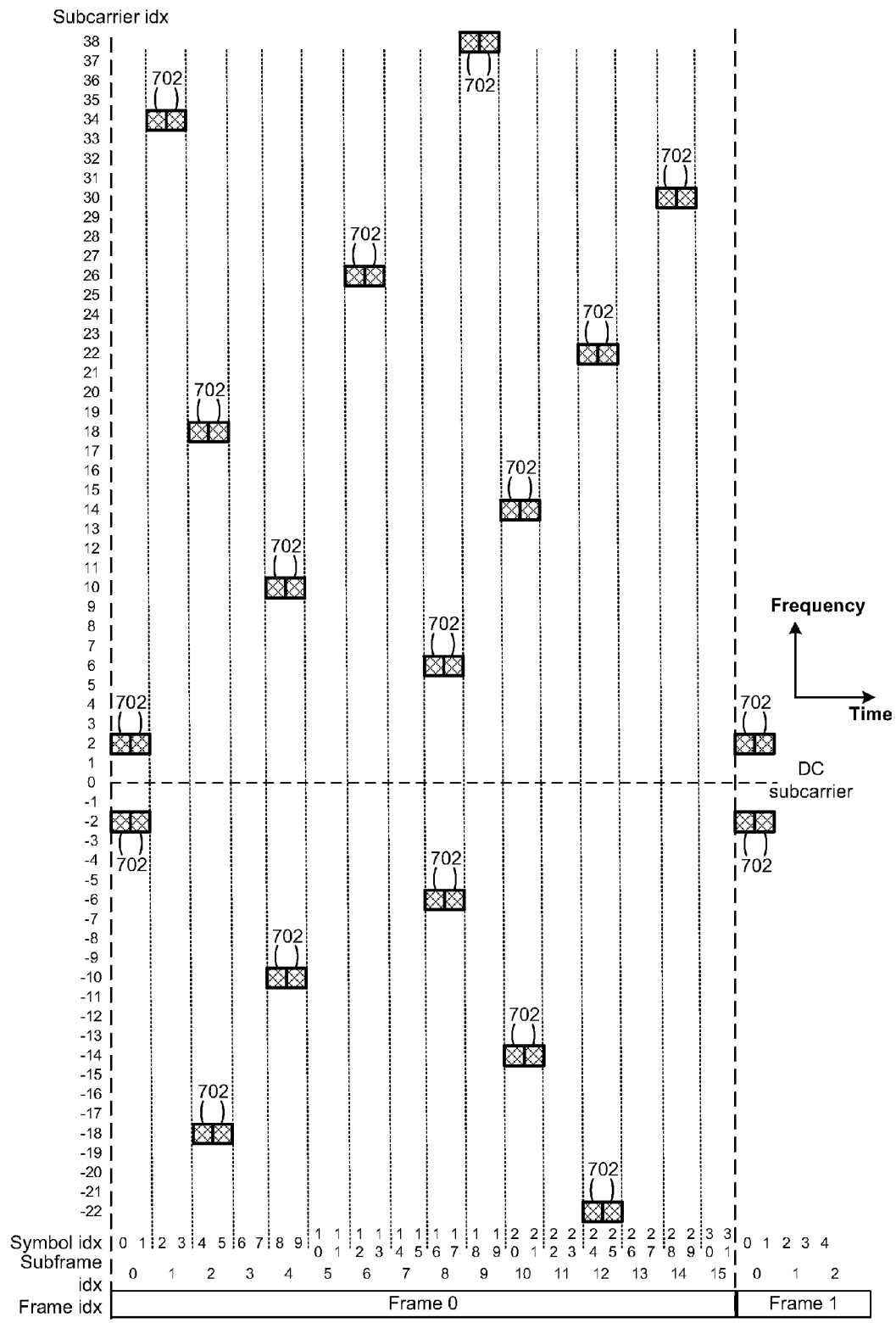
FIG. 7 illustrates successive pairs of OFDM symbols with pilot symbols on different sets of subcarriers in accordance with some embodiments.

FIG. 7 illustrates successive pairs of OFDM symbols transmitted by a transmitter 102 (FIG. 1A) and received by a receiver 106 (FIG. 1A). The OFDM symbols include known pilot symbols 702 on different sets of subcarriers (the placing of the pilot symbols 702 is indicated by the boxes in FIG. 7). These pilot symbols 702 are known modulation symbols placed on respective subcarriers. The OFDM symbols are indexed by a symbol index ("symbol idx") and the subcarriers are indexed by a subcarrier index ("subcarrier idx"). Successive pairs of OFDM symbols compose respective subframes, which are indexed by a subframe index ("subframe idx"). For example, OFDM symbols 0 and 1 compose subframe 0, OFDM symbols 2 and 3 compose subframe 1, and so on. A specified number of subframes (e.g., 16 subframes) compose a frame. Frames are indexed by a frame index ("frame idx"). FIG. 7 shows only a snapshot (i.e., a portion) of the available subcarriers. For example, there may be 4096, 8192, or 16,384 subcarriers.

Pilot symbols 702 are placed on the same subcarriers in both OFDM symbols of a subframe (e.g., in accordance with Equation (6) for pilot matrices) and are symmetric (e.g., mirrored) about a center carrier frequency, which is the DC subcarrier in baseband. The subcarriers used for pilot symbols 702 are evenly spaced on each side of the center carrier frequency. For example, 1 of every 64 subcarriers is used for a pilot symbol 702. For OFDM symbols 0 and 1 (i.e., subframe 0), subcarriers 2, 66, 130, and so on, and also subcarriers −2, −66, −130, and so on, are used for pilot symbols 702. For OFDM symbols 2 and 3 (i.e., subframe 1), subcarriers 34, 98, 162, and so on, and also subcarriers −34, −98, −162, and so on, are used for pilot symbols 702. The pilot symbol overhead is thus 1/64 (or more generally, a predefined fraction), resulting in a corresponding reduction in spectral efficiency; the remaining 63 of each 64 subcarriers may be used for data transmission.

Within a given subframe, the pilot symbols 702 are generated in accordance with equation (6) or a variant of equation (6) in which one of the columns of the orthogonal pilot matrix of equation (6) is multiplied by −1 (thus maintaining the orthogonality). In the pilot matrix of equation (6), or variants thereof, the first column corresponds to the first OFDM symbol in the subframe and the second column corresponds to the second OFDM symbol in the subframe. The first two entries in each column correspond to the real and imaginary components of a pilot symbol 702 above the center carrier frequency and the second two entries in each column correspond to the real and imaginary components of a pilot symbol 702 below the center carrier frequency. For example, the first OFDM symbol includes a first pilot symbol 702 on a subcarrier above the center carrier frequency (i.e., a positive subcarrier) and a second pilot symbol 702 on a subcarrier below the center carrier frequency (i.e., a negative subcarrier), and the second OFDM symbol includes the first pilot symbol 702 on the subcarrier below the center carrier frequency and the negative of the second pilot symbol 702 on the subcarrier above the center carrier frequency. Alternatively, the second OFDM symbol includes the second pilot symbol 702 on the subcarrier above the center carrier frequency and the negative of the first pilot symbol 702 on the subcarrier below the center carrier frequency. In these examples, the subcarrier above the center carrier frequency and the subcarrier below the center carrier frequency (i.e., the negative and positive subcarriers) are symmetric about the center carrier frequency.

The pilot symbol subcarriers in the different subframes of a frame are staggered with respect to each other, such that a predefined fraction of subcarriers are used for pilot symbols 702 somewhere in the frame. The subcarriers to be used for pilot symbols 702 in a given subframe may be determined by averaging the indices of the subcarriers used in two previous subframes, resulting in a pattern that is staggered in time as shown in FIG. 7. In the example of FIG. 7, every fourth subcarrier is used for pilot symbols 702 in some subframe within the frame. Each frame in this example thus includes OFDM symbols with 16 different sets of pilot positions.

For each subframe, the receiver 106 (FIG. 1A) estimates frequency responses for the subcarriers of the pilot symbols 702 (e.g., using Equation (7)) and compensates accordingly for the estimated frequency response, which represents signal impairment. Thus, in the example of FIG. 7, frequency response estimation is performed for every fourth subcarrier during reception of each frame. Frequency responses for the remaining subcarriers (i.e., the subcarriers not used for pilot symbols 702 anywhere in the frame) may be interpolated and compensated for accordingly.

Including pilot symbols 702 in each OFDM symbol (e.g., staggered in a pattern such as the pattern of FIG. 7, or alternatively in the same subcarriers from OFDM symbol to OFDM symbol) enables continuous tracking of phase noise and carrier frequency offset, while using only a small amount of overhead (e.g., 1/64). Furthermore, the symmetry of the pilot symbol subcarriers about the center carrier frequency and the use of the same subcarriers for pilot symbols 702 in a pair of OFDM symbols (e.g., in accordance with Equation (6)) enables correction of transmitter and/or receiver IQ mismatch (e.g., in accordance with Equation (7)).

The spacing of subcarriers used for pilot symbols 702 within a frame may be determined based on the minimal coherence bandwidth, which corresponds to a maximal delay spread equal to the cyclic prefix length. For example, for a cyclic prefix length of 4 us, and thus a maximal delay spread of 4 us, the minimal coherence bandwidth is 250 kHz. The spacing of pilot symbol subcarriers may be a specified fraction of the coherence bandwidth. For example, if the spacing between subcarriers in FIG. 7 is 12.5 kHz, the spacing between subcarriers used for pilot symbols 702 somewhere within a frame is 50 kHz, or one-fifth of the coherence bandwidth, since every fourth subcarrier is used for pilot symbols 702 at some point within a frame.

Attention is now directed to joint estimation of and correction for both transmitter-side I/Q mismatch and receiver-side I/Q mismatch. In some embodiments, carrier frequency offset is estimated, after which joint estimation of transmitter-side I/Q mismatch and receiver-side I/Q mismatch is performed.

Let us define $p_1 = a_{Rx} a_{Tx}$, $p_2 = a_{Rx} b_{Tx}$, $p_3 = b_{Rx} a_{Tx}^*$, $p_4 = b_{Rx} b_{Tx}^*$. These four unknown parameters can be estimated in a similar fashion as in the case of receiver-only IQ mismatch. The received signal vector $z[n]$ can be written as $$z[n] = [\tilde{x}_1[n] \quad \tilde{x}_2[n] \quad \tilde{x}_3[n] \quad \tilde{x}_4[n]] \begin{bmatrix} p_1 \\ p_2 \\ p_3 \\ p_4 \end{bmatrix} + \tilde{w}[n]$$

where $\tilde{x}_1[n] = e^{j\Delta\omega n} x[n]$, $\tilde{x}_2[n] = e^{j\Delta\omega n} x^*[n]$, $\tilde{x}_3[n] = e^{-j\Delta\omega n} x^*[n]$, $\tilde{x}_4[n] = e^{-j\Delta\omega n} x[n]$. Inversion of the N×4 system matrix to solve for the four unknown parameters can be avoided by employing adaptive filtering techniques such as LMS.

Once the signal parameters have been estimated, CFO, transmitter-side I/Q mismatch, and receiver-side I/Q mismatch can be compensated. The received signal can be re-written as $$z[n] = (p_1 e^{j\Delta\omega n} + p_4 e^{-j\Delta\omega n}) x[n] + (p_2 e^{j\Delta\omega n} + p_3 e^{-j\Delta\omega n}) x^*[n] + a_{Rx} w[n] + b_{Rx} w^*[n]$$

Transmitter-side I/Q mismatch and receiver-side I/Q mismatch can be compensated jointly via the following transformation:

$$\hat{z}[n] = \frac{1}{|u[n]|^2 - |s[n]|^2} [u^*[n]z[n] - s[n]z^*[n]]$$

where $u[n] = p_1 e^{j\Delta\omega n} + p_4 e^{-j\Delta\omega n}$ and $s[n] = p_2 e^{j\Delta\omega n} + p_3 e^{-j\Delta\omega n}$. The signal after joint CFO and I/Q compensation reads $$\hat{z}[n] = x[n] + \tilde{w}[n]$$

For small I/Q mismatch, such that we can approximate $f[n] \approx 1$, $\sin \Delta\phi \approx \Delta\phi$, $\cos \Delta\phi \approx 1$, $g[n] \sin \Delta\phi \approx 0$, the signal model simplifies to $$z[n] = e^{j\Delta\omega n}x[n] + b_{Tx}e^{j\Delta\omega n}x^*[n] + b_{Rx}e^{-j\Delta\omega n}x^*[n] + w[n] + b_{Rx}w^*[n]$$

This simplification allows the transmitter-side I/Q mismatch and receiver-side I/Q mismatch to be estimated separately. In some embodiments, the correction procedure would first compensate for receiver-side I/Q mismatch, then compensate for the CFO (e.g., via phase rotation), and then compensate for the transmitter-side I/Q mismatch. For example, the method 300 (FIG. 3B) would be used for the correction procedure.

In some embodiments the method 350 (FIG. 3A) is used for joint compensation, wherein operations 354 and 360 estimate the joint receiver-side and transmitter-side I/Q mismatch and operations 356 and 362 compensate for the joint I/Q mismatch.

Figure 2E:
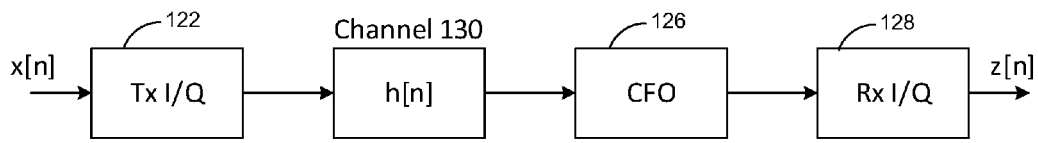

Joint estimation of and correction for both transmitter-side I/Q mismatch and receiver-side I/Q mismatch may be performed for wideband signals (e.g., after the carrier frequency offset has been estimated). In some embodiments, if signals occupy a wide bandwidth, multipath channel effects are considered, as is the frequency dependency of I/Q mismatch at both the transmitter side and receiver side. FIG. 2E illustrates signal impairments for wideband signals, including a channel transfer function h[n] for a channel 130.

The overall received signal at the receiver can be expressed as the sum of four signal components and an effective noise component $$z[n] = a_{Rx}[n]^* [e^{j\Delta\omega n}(h[n]^* a_{Tx}[n]^* x[n])] + a_{Rx}[n]^* [e^{j\Delta\omega n}(h[n]^* b_{Tx}[n]^* x^*[n])] + b_{Rx}[n]^* [e^{-j\Delta\omega n}(h^*[n]^* a_{Tx}^*[n]^* x^*[n])] + b_{Rx}[n]^* [e^{-j\Delta\omega n}(h^*[n]^* b_{Tx}^*[n]^* x[n])] + a_{Rx}[n]^* w[n] + b_{Rx}[n]^* w^*[n]$$

The signal components other than the first constitute the interference due to transmitter I/Q mismatch and receiver I/Q mismatch. The last interference term is presumably quite weak as compared to the preceding two.

Before compensating for I/Q mismatch, the CFO is estimated by employing a narrowband signal (e.g., a narrowband training signal). In some embodiments, the I/Q mismatch is then estimated separately for the receiver side and the transceiver side, by analogy for the narrowband case, using convolution matrices to account for the frequency dependency of the I/Q mismatch.

Alternatively, joint estimation and correction of transmitter-side I/Q mismatch and receiver-side I/Q mismatch is performed. If the CFO is small compared to the coherence bandwidth of the channel and transmitter/receiver I/Q filters, the frequency shift due to CFO can be corrected before filtering operations. Therefore, the received signal in the frequency domain can be expressed as $$Z(f) = P_1(f)X\left(f + \frac{\Delta\omega}{2\pi}\right) + P_2(f)X^*\left(-f + \frac{\Delta\omega}{2\pi}\right) + P_3(f)X^*\left(-f - \frac{\Delta\omega}{2\pi}\right) + P_4(f)X\left(f - \frac{\Delta\omega}{2\pi}\right) + \tilde{W}(f)$$

Estimation and compensation are performed using the method described above with respect to FIG. 6 that results in equation (7), in accordance with some embodiments.

Attention is now directed to a method of communication using pilot symbols, such as the pilot symbols 702 (FIG. 7). FIG. 8 is a flowchart showing a method 800 of communicating between an OFDM transmitter (e.g., the transmitter 102, FIG. 1A) and an OFDM receiver (e.g., the receiver 106, FIG. 1A) in accordance with some embodiments.

The OFDM transmitter transmits (802) successive pairs of OFDM symbols (e.g., successive subframes that include pilot symbols 702 on both OFDM symbols of each subframe, as shown in FIG. 7). Both OFDM symbols of a respective pair include pilot symbols on one or more groups of two subcarriers. The two subcarriers of each group are the same for both OFDM symbols and are symmetric about a center carrier frequency. The pilot symbols on the two subcarriers compose an orthogonal matrix (e.g., in accordance with equation (6) or a variant of equation (6) in which one of the columns is multiplied by −1).

In some embodiments, the OFDM symbols of the successive pairs include (804) pilot symbols on respective subsets of a plurality of subcarriers (e.g., as shown in FIG. 7). Both OFDM symbols of each of the successive pairs have pilot symbols on a respective subset of the plurality of subcarriers. The respective subsets of the plurality of subcarriers are distinct.

In some embodiments, the respective subsets of the plurality of subcarriers include (805) subcarriers that are evenly spaced on each side of a center carrier frequency and have mirror symmetry about the center carrier frequency. For example, the pilot symbols 702 have mirror symmetry about the DC subcarrier and may be placed on a predefined fraction of subcarriers in an evenly spaced manner (e.g., on every 64th subcarrier in an OFDM symbol).

In some embodiments, the respective subsets of the plurality of subcarriers are staggered (806) with respect to each other. For example, the index of a subcarrier on which pilot symbols are placed for a pair of OFDM symbols may be determined by averaging the indices of subcarriers on which pilot symbols were placed for two previous pairs of subcarriers. In FIG. 7, the pair of OFDM symbols in subframe 0 includes pilot symbols on subcarriers ±2, the pair of OFDM symbols in subframe 1 includes pilot symbols on subcarriers ±34, and the pair of OFDM symbols in subframe 2 includes pilot symbols on subcarriers ±18. The subcarrier indices for the pilot symbols in subframe 2 are determined by averaging the subcarrier indices for the pilot symbols in subframes 0 and 1: 18 is the average of 2 and 34, and −18 is the average of −2 and −34. Similarly, the pair of OFDM symbols in subframe 4 includes pilot symbols on subcarriers ±10, as determined by averaging subcarrier indices for subframes 0 and 2.

In some embodiments, pilot symbols for respective pairs (e.g., each pair) of OFDM symbols are generated in accordance with equation (6) or a variant of equation (6) in which one of the columns of the orthogonal pilot matrix of equation (6) is multiplied by −1 (thus maintaining the orthogonality). For example, the first OFDM symbol of a pair includes a first pilot symbol on a first subcarrier above a center carrier frequency and a second pilot symbol on a second subcarrier below the center carrier frequency and symmetric with the first subcarrier about the center carrier frequency. The second OFDM symbol of the pair includes the first pilot symbol on the second subcarrier and the negative of the second pilot symbol on the first subcarrier. Alternatively, the second OFDM symbol of the pair includes the negative of the first pilot symbol on the second subcarrier and the second pilot symbol on the first subcarrier.

The OFDM receiver receives (808) the successive pairs of OFDM symbols. Using the pilot symbols, the OFDM receiver estimates (810) frequency responses at frequencies corresponding to the subcarriers carrying pilot symbols (e.g., to the respective subsets of the plurality of subcarriers). This estimation is performed, for example, using equation (7). In some embodiments, the OFDM receiver interpolates (812) frequency responses for subcarriers not carrying pilot symbols (e.g., for subcarriers not included in the respective subsets of the plurality of subcarriers), based on the estimated frequency responses. The OFDM receiver compensates (814) for signal impairment based at least in part on the estimated frequency responses. In some embodiments, the OFDM receiver compensates (816) for the signal impairment based further on the interpolated frequency responses.

While the method 800 includes a number of operations that appear to occur in a specific order, it should be apparent that the method 800 can include more or fewer operations, which can be executed serially or in parallel. Performance of two or more operations may overlap and two or more operations may be combined into a single operation. For example, all of the operations of the method 800 may be performed in an ongoing basis.

Figure 5:
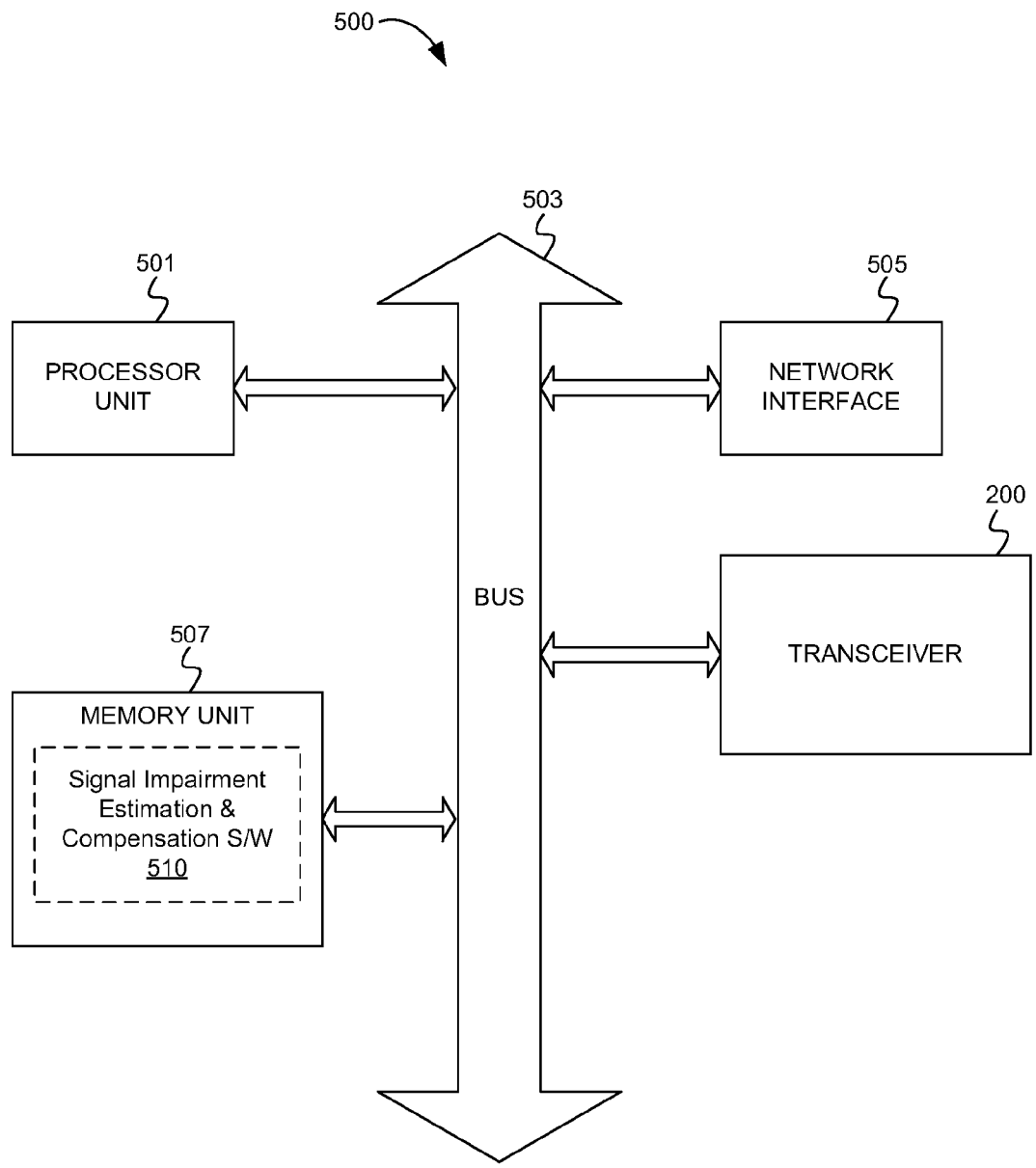
FIG. 5 is a block diagram of a communication device in accordance with some embodiments.

FIG. 5 is an example of a block diagram of a communication device 500 that performs signal impairment estimation and compensation. In some embodiments, the device 500 is a wireless device (e.g., a WLAN device, such as a personal computer, laptop or tablet computer, mobile phone, personal digital assistant, GPS device, wireless access point, or other electronic device). In some embodiments, the device 500 has a wired network connection.

The device 500 includes a processor unit 501, memory unit 507, network interface 505, and transceiver 200 (FIG. 2A) coupled by a bus 503. The processor unit 501 includes one or more processors and/or processor cores. In some embodiments, the network interface 505 includes at least one wireless network interface (e.g., a WLAN interface, a Bluetooth® interface, a WiMAX interface, a ZigBee® interface, a Wireless USB interface, etc.). In some embodiments, the device 500 includes at least one wired network interface (e.g., to interface with a coaxial cable or other physical medium).

The memory unit 507 includes a non-transitory computer-readable storage medium (e.g., one or more nonvolatile memory elements, such as EPROM, EEPROM, Flash memory, a hard disk drive, and so on) that stores a signal impairment estimation and compensation software module 510. In some embodiments, the software module 510 includes one or more programs with instructions that, when executed by processor unit 501 and/or by the receiver baseband processor 280 (FIG. 2A), cause the mobile device 500 to perform the methods 300 and/or 350 (FIGS. 3A-3B). In some embodiments, these instructions include instructions for performing time-domain compensation (e.g., as described with regard to FIGS. 4A-4D and equations 1-5) and/or frequency domain compensation. In some embodiments, these instructions include instructions for separately estimating and compensating for transmitter IQ mismatch and receiver IQ mismatch and/or for jointly estimating and compensating for transmitter IQ mismatch and receiver IQ mismatch, using any technique described herein. In some embodiments, these instructions include instructions for performing all or part of the transmitter-side and/or receiver-side portions of the method 800 (FIG. 8).

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of operating an orthogonal frequency-division multiplexing (OFDM) receiver, comprising:
   receiving, via an antenna, successive pairs of OFDM symbols, the OFDM symbols of the successive pairs comprising pilot symbols on distinct respective subsets of a plurality of subcarriers, that are the same for both OFDM symbols in each pair, both OFDM symbols of each of the successive pairs having pilot symbols on a respective subset of the plurality of subcarriers, the pilot symbols of each of the successive pairs composing an orthogonal matrix, the respective subsets being symmetric about the center carrier frequency;
   estimating frequency responses at frequencies of the respective subsets of the plurality of subcarriers using the pilot symbols; and
   compensating for signal impairment based at least in part on the estimated frequency responses at the frequencies of the respective subsets of the plurality of subcarriers.

2. The method of claim 1, wherein:
   a first pair of the successive pairs of OFDM symbols comprises pilot symbols on a first subset of the plurality of subcarriers;
   the first subset comprises a first subcarrier above the center carrier frequency and a second subcarrier below the center carrier frequency;
   a first OFDM symbol of the first pair comprises a first pilot symbol on the first subcarrier and a second pilot symbol on the second subcarrier; and
   a second OFDM symbol of the first pair comprises the first pilot symbol on the second subcarrier and the negative of the second pilot symbol on the first subcarrier.

3. The method of claim 1, wherein:
   a first pair of the successive pairs of OFDM symbols comprises pilot symbols on a first subset of the plurality of subcarriers;
   the first subset comprises a first subcarrier above the center carrier frequency and a second subcarrier below the center carrier frequency;
   a first OFDM symbol of the first pair comprises a first pilot symbol on the first subcarrier and a second pilot symbol on the second subcarrier; and
   a second OFDM symbol of the first pair comprises the negative of the first pilot symbol on the second subcarrier and the second pilot symbol on the first subcarrier.

4. The method of claim 1, wherein the respective subsets of the plurality of subcarriers are staggered with respect to each other.

5. The method of claim 4, wherein:
   the successive pairs of OFDM symbols comprise a first pair, a second pair subsequent to the first pair, and a third pair subsequent to the second pair;
   the first pair comprises pilot symbols on a subcarrier having a first index;
   the second pair comprises pilot symbols on a subcarrier having a second index; and the third pair comprises pilot symbols on a subcarrier having a third index equal to an average of the first index and the second index.

6. The method of claim 1, wherein:
the successive pairs of OFDM symbols compose a frame; and
the frame includes pilot symbols on a specified fraction of the plurality of subcarriers.

7. The method of claim 1, further comprising interpolating frequency responses for subcarriers not included in the respective subsets of the plurality of subcarriers, based on the estimated frequency responses at the frequencies of the respective subsets of the plurality of subcarriers;
wherein compensating for the signal impairment is further based on the interpolated frequency responses.

8. A method of operating an orthogonal frequency-division multiplexing (OFDM) transmitter, comprising:
transmitting, via an antenna, successive pairs of OFDM symbols, wherein the OFDM symbols of the successive pairs comprises pilot symbols on distinct respective subsets of a plurality of subcarriers, that are the same for both OFDM symbols in each pair, both OFDM symbols of each of the successive pairs include pilot symbols on a respective subset of the plurality of subcarriers, the pilot symbols of each of the successive pairs compose an orthogonal matrix, and the respective subsets are symmetric about the center carrier frequency.

9. The method of claim 8, wherein:
a first pair of the successive pairs of OFDM symbols comprises pilot symbols on a first subset of the plurality of subcarriers;
the first subset comprises a first subcarrier above the center carrier frequency and a second subcarrier below the center carrier frequency;
a first OFDM symbol of the first pair comprises a first pilot symbol on the first subcarrier and a second pilot symbol on the second subcarrier; and
a second OFDM symbol of the first pair comprises the first pilot symbol on the second subcarrier and the negative of the second pilot symbol on the first subcarrier.

10. The method of claim 8, wherein:
a first pair of the successive pairs of OFDM symbols comprises pilot symbols on a first subset of the plurality of subcarriers;
the first subset comprises a first subcarrier above the center carrier frequency and a second subcarrier below the center carrier frequency;
a first OFDM symbol of the first pair comprises a first pilot symbol on the first subcarrier and a second pilot symbol on the second subcarrier; and
a second OFDM symbol of the first pair comprises the negative of the first pilot symbol on the second subcarrier and the second pilot symbol on the first subcarrier.

11. The method of claim 8, wherein the respective subsets of the plurality of subcarriers are staggered with respect to each other.

12. The method of claim 11, wherein transmitting the successive pairs of OFDM symbols comprises:
in a first pair, placing pilot symbols on a subcarrier having a first index;
in a second pair subsequent to the first pair, placing pilot symbols on a subcarrier having a second index; and
in a third pair subsequent to the first and second pairs, placing pilot symbols on a subcarrier having a third index equal to an average of the first index and the second index.

13. The method of claim 8, wherein:
the successive pairs of OFDM symbols compose a frame; and
the frame includes pilot symbols on a specified fraction of the plurality of subcarriers.

14. A communications device, comprising an orthogonal frequency-division multiplexing (OFDM) receiver to:
receive, via an antenna, successive pairs of OFDM symbols, wherein the OFDM symbols of the successive pairs comprise pilot symbols on distinct respective subsets of a plurality of subcarriers that are the same for both OFDM symbols in each pair, both OFDM symbols of each of the successive pairs include pilot symbols on a respective subset of the plurality of subcarriers, the pilot symbols of each of the successive pairs compose an orthogonal matrix, and the respective subsets are symmetric about the center carrier frequency; and
the OFDM receiver is to estimate frequency responses at frequencies of the respective subsets of the plurality of subcarriers using the pilot symbols.

15. The communications device of claim 14, wherein:
a first pair of the successive pairs of OFDM symbols comprises pilot symbols on a first subset of the plurality of subcarriers;
the first subset comprises a first subcarrier above the center carrier frequency and a second subcarrier below the center carrier frequency;
a first OFDM symbol of the first pair comprises a first pilot symbol on the first subcarrier and a second pilot symbol on the second subcarrier; and
a second OFDM symbol of the first pair comprises the first pilot symbol on the second subcarrier and the negative of the second pilot symbol on the first subcarrier.

16. The communications device of claim 14, wherein:
a first pair of the successive pairs of OFDM symbols comprises pilot symbols on a first subset of the plurality of subcarriers;
the first subset comprises a first subcarrier above the center carrier frequency and a second subcarrier below the center carrier frequency;
a first OFDM symbol of the first pair comprises a first pilot symbol on the first subcarrier and a second pilot symbol on the second subcarrier; and
a second OFDM symbol of the first pair comprises the negative of the first pilot symbol on the second subcarrier and the second pilot symbol on the first subcarrier.

17. The communications device of claim 14, wherein the respective subsets of the plurality of subcarriers are staggered with respect to each other.

18. The communications device of claim 17, wherein:
the successive pairs of OFDM symbols comprise a first pair, a second pair subsequent to the first pair, and a third pair subsequent to the second pair;
the first pair comprises pilot symbols on a subcarrier having a first index;
the second pair comprises pilot symbols on a subcarrier having a second index; and
the third pair comprises pilot symbols on a subcarrier having a third index equal to an average of the first index and the second index.

19. The communications device of claim 14, wherein:
the successive pairs of OFDM symbols compose a frame; and
the frame includes pilot symbols on a specified fraction of the plurality of subcarriers.

20. The communications device of claim 14, wherein:
the OFDM receiver is further to interpolate frequency responses for subcarriers not included in the respective subsets of the plurality of subcarriers, based on the estimated frequency responses at the frequencies corresponding to the respective subsets of the plurality of subcarriers; and
the OFDM receiver is to compensate for the signal impairment based further on the interpolated frequency responses.

21. A communications device, comprising an orthogonal frequency-division multiplexing (OFDM) transmitter to transmit via an antenna successive pairs of OFDM symbols, wherein:
the OFDM symbols of the successive pairs comprise pilot symbols on distinct respective subsets of a plurality of subcarriers that are the same for both OFDM symbols in each pair, both OFDM symbols of each of the successive pairs include pilot symbols on a respective subset of the plurality of subcarriers, the pilot symbols of each of the successive pairs compose an orthogonal matrix, and the respective subsets are symmetric about the center carrier frequency.

22. The communications device of claim 21, wherein:
a first pair of the successive pairs of OFDM symbols comprises pilot symbols on a first subset of the plurality of subcarriers;
the first subset comprises a first subcarrier above the center carrier frequency and a second subcarrier below the center carrier frequency;
a first OFDM symbol of the first pair comprises a first pilot symbol on the first subcarrier and a second pilot symbol on the second subcarrier; and
a second OFDM symbol of the first pair comprises the negative of the first pilot symbol on the second subcarrier and the second pilot symbol on the first subcarrier.

23. The communications device of claim 21, wherein:
a first pair of the successive pairs of OFDM symbols comprises pilot symbols on a first subset of the plurality of subcarriers;
the first subset comprises a first subcarrier above the center carrier frequency and a second subcarrier below the center carrier frequency;
a first OFDM symbol of the first pair comprises a first pilot symbol on the first subcarrier and a second pilot symbol on the second subcarrier; and
a second OFDM symbol of the first pair comprises the first pilot symbol on the second subcarrier and the negative of the second pilot symbol on the first subcarrier.

24. The communications device of claim 21, wherein the respective subsets of the plurality of subcarriers are staggered with respect to each other.

25. The communications device of claim 24, wherein the transmitter is to:
place pilot symbols on a subcarrier having a first index in a first pair of OFDM symbols;
place pilot symbols on a subcarrier having a second index in a second pair of OFDM symbols subsequent to the first pair; and
place pilot symbols on a subcarrier having a third index equal to an average of the first index and the second index in a third pair of OFDM symbols subsequent to the first and second pairs.

26. The communications device of claim 21, wherein:
the successive pairs of OFDM symbols compose a frame; and
the frame includes pilot symbols on a specified fraction of the plurality of subcarriers.

* * * * *